(12) United States Patent
Koyama et al.

(10) Patent No.: US 7,791,986 B2
(45) Date of Patent: Sep. 7, 2010

(54) OPTICAL INFORMATION RECORDING/REPRODUCING APPARATUS

(75) Inventors: Osamu Koyama, Hachioji (JP);
Koichiro Nishikawa, Takasaki (JP);
Shinnosuke Torii, Kawasaki (JP);
Chihiro Nagura, Kawasaki (JP);
Haruhiko Horiguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 641 days.

(21) Appl. No.: 11/685,863

(22) Filed: Mar. 14, 2007

(65) Prior Publication Data

US 2007/0217300 A1    Sep. 20, 2007

(30) Foreign Application Priority Data

| Mar. 15, 2006 | (JP) | ............................. 2006-070839 |
| Mar. 15, 2006 | (JP) | ............................. 2006-070841 |
| Mar. 15, 2006 | (JP) | ............................. 2006-071124 |
| Mar. 15, 2006 | (JP) | ............................. 2006-071129 |
| Apr. 24, 2006 | (JP) | ............................. 2006-118789 |

(51) Int. Cl.
*G11B 7/00* (2006.01)

(52) U.S. Cl. ............... 369/44.23; 369/118; 369/112.02; 369/13.33

(58) Field of Classification Search .............. 369/13.33, 369/44.23, 112.02, 112.16, 112.17, 112.24, 369/118, 94

See application file for complete search history.

(56) References Cited

U.S. PATENT DOCUMENTS

| 4,803,579 A | 2/1989 | Koyama | ..................... 360/114 |
| 4,813,032 A | 3/1989 | Koyama | ..................... 369/13 |
| 4,953,124 A | 8/1990 | Koyama | ..................... 365/122 |
| 5,029,261 A | 7/1991 | Koyama et al. | .......... 250/201.5 |
| 5,039,202 A | 8/1991 | Koyama et al. | ............. 359/823 |
| 5,231,621 A | 7/1993 | Matsui et al. | ............ 369/44.32 |
| 5,293,371 A | 3/1994 | Koyama | ..................... 369/110 |
| 5,293,569 A | 3/1994 | Koyama | ..................... 369/112 |
| 5,347,503 A | 9/1994 | Koyama et al. | .......... 369/44.32 |
| 5,353,274 A | 10/1994 | Nishikawa | .................. 369/121 |
| 5,404,346 A | 4/1995 | Koyama et al. | .......... 369/44.32 |
| 5,463,610 A | 10/1995 | Nishikawa | .................. 369/121 |

(Continued)

OTHER PUBLICATIONS

C. A. Verschuren et al., "Near Field Recording on First-Surface Write-Once Media with a NA=1.9 Solid Immersion Lens." Japanese Journal of Applied Physics, vol. 44, No. 5B, pp. 3564-3567 (May 2005).

(Continued)

*Primary Examiner*—Wayne R Young
*Assistant Examiner*—Brenda Bernardi
(74) *Attorney, Agent, or Firm*—Fitzpatrick, Cella, Harper & Scinto

(57) ABSTRACT

There is provided an optical information recording/reproducing apparatus including a unit for detecting the focus error signal from the reflected light flux from a recording layer of an optical recording medium, and a unit for focusing the light flux on the recording layer of the optical disk on the basis of the focus error signal. In the case of detecting the focus error signal, the light flux of the effective numeric aperture NAeff<1 due to an objective lens and the SIL within a pupil is obtained by a splitting device as the focus error signal, whereby it is possible to suppress the reflected light from the bottom surface of the SIL from being mixed into the focus error signal as a noise.

6 Claims, 17 Drawing Sheets

U.S. PATENT DOCUMENTS

| | | | |
|---|---|---|---|
| 5,517,475 A | 5/1996 | Koyama et al. | 369/44.32 |
| 5,517,480 A | 5/1996 | Matsuoka et al. | 369/110 |
| 5,528,576 A | 6/1996 | Nishikawa | 369/112 |
| 5,532,990 A | 7/1996 | Koyama et al. | 369/44.32 |
| 5,546,373 A | 8/1996 | Koyama | 369/120 |
| 5,557,601 A | 9/1996 | Nishikawa | 369/121 |
| 5,586,097 A | 12/1996 | Nishikawa | 369/112 |
| 5,608,716 A | 3/1997 | Koyama et al. | 369/275.1 |
| 5,657,305 A | 8/1997 | Sasaki et al. | 369/110 |
| 5,745,449 A | 4/1998 | Koyama | 369/44.32 |
| 5,974,009 A * | 10/1999 | Tamura et al. | 369/44.29 |
| 5,995,472 A | 11/1999 | Fujii et al. | 369/110 |
| 6,031,810 A | 2/2000 | Nishikawa | 369/121 |
| 6,097,688 A * | 8/2000 | Ichimura et al. | 369/112.24 |
| 6,128,270 A * | 10/2000 | Nishikawa | 369/275.4 |
| 6,141,302 A | 10/2000 | Koyama et al. | 369/44.24 |
| 6,282,165 B1 | 8/2001 | Koyama et al. | 369/118 |
| 6,298,015 B1 | 10/2001 | Ishii et al. | 369/13 |
| 6,418,109 B2 | 7/2002 | Koyama et al. | 369/118 |
| 6,738,323 B1 * | 5/2004 | Imanishi et al. | 369/44.32 |
| 6,909,673 B2 | 6/2005 | Ishii et al. | 369/13.12 |
| 7,145,847 B2 | 12/2006 | Nagura et al. | 369/44.26 |
| 7,483,345 B2 * | 1/2009 | Song | 369/44.23 |
| 2003/0081530 A1 * | 5/2003 | Sato et al. | 369/112.24 |
| 2004/0013077 A1 * | 1/2004 | Saito et al. | 369/112.24 |
| 2004/0047271 A1 * | 3/2004 | Mizuno | 369/112.24 |
| 2005/0081228 A1 | 4/2005 | Torii | 720/704 |
| 2005/0122860 A1 | 6/2005 | Koyama | 369/44.32 |
| 2005/0163000 A1 | 7/2005 | Nishikawa | 369/44.37 |
| 2006/0023577 A1 * | 2/2006 | Shinoda et al. | 369/44.23 |
| 2006/0140072 A1 * | 6/2006 | Sato et al. | 369/44.23 |
| 2006/0187786 A1 | 8/2006 | Torii | 369/47.54 |
| 2006/0256686 A1 | 11/2006 | Torii | 369/53.37 |
| 2006/0262705 A1 | 11/2006 | Koyama | 369/112.01 |
| 2006/0280106 A1 * | 12/2006 | 'T Hooft et al. | 369/275.1 |
| 2006/0280897 A1 | 12/2006 | Koyama | 428/64.4 |
| 2007/0086288 A1 | 4/2007 | Torii | 369/44.23 |
| 2007/0121468 A1 | 5/2007 | Koyama et al. | 369/103 |
| 2007/0121469 A1 | 5/2007 | Torii | 369/112.01 |
| 2007/0247984 A1 * | 10/2007 | Ophey | 369/44.26 |

OTHER PUBLICATIONS

F. Zijp et al., "Near Field Read-Out of a 50 GB First-Surface Disk with NA=1.9 and a Proposal for a Cover-Layer Incident, Dual-Layer Near Field System." Optical Data Storage 2004, Proceedings of SPIE, vol. 5380, pp. 209-223 (Apr. 2004).

* cited by examiner

OPTICAL INFORMATION RECORDING/REPRODUCING APPARATUS

BACKGROUND OF THE INVENTION

1. Field of the Invention

The present invention relates to an optical information recording/reproducing apparatus such as an optical disc device, and more particularly, to an optical information recording/reproducing apparatus for recording or reproducing information on a recording layer of an optical recording medium using a solid immersion lens (hereinafter referred to as "SIL").

2. Description of the Related Art

In general, in order to improve the recording density of an optical disc, a demand is made to shorten the wavelength of a light used in recording and reproduction, increase a numeric aperture (NA) of an objective lens, and decrease an optical spot diameter on an optical disc recording surface.

As one method of meeting the above-mentioned demand, an attempt has been made in which a front lens of objective lenses comes close to the recording surface to the degree of a fraction of divers of the recording wavelength to constitute a so-called SIL. Thus, an attempt has been made to set NA to 1 or more even in the air.

Those techniques are disclosed in more detail in, for example, Japan journal applied physics, vol. 44 (2005), pp. 3564 to 3567, "Near field recording on first-surface write-once media with a NA=1.9 solid immersion lens". Further, the techniques are disclosed in more detail in Optical data storage 2004, proceedings of SPIE vol. 5380 (2004), "Near field read-out of first-surface disk with NA=1.9 and a proposal for a cover-layer incident, dual-layer near field system".

The related art will be described with reference to FIGS. 19 to 23. First, a description will be given of the configuration of an optical pickup for a near field recording that is disclosed in Japan journal applied physics, vol. 44 (2005), pp. 3564 to 3567, with reference to FIG. 19. Referring to FIG. 19, reference numeral 1 denotes a semiconductor laser, 2 is a collimator lens, 3 is a beam shaping prism, 4 is an NBS, 5, 15, 19 and 26 are lenses, 6 is an LPC-PD, 7 is a PBS, 8 is a QWP, 9 is an expander lens, 10 is an objective lens, 11 is an SIL, 12 is a dual-layer disc, 13 is an HWP, 14 is a PBS, 16 is a PD1, 17 is an RF output, 18 is an NBS, 20 is a PD2, 21 is a tracking error, 27 is a PD3, and 28 is a gap error.

Referring to FIG. 19, a light flux that is output from a semiconductor laser 1 having a wavelength of 405 nm is converted into a collimated light flux by a collimator lens 2, and then input to a beam shaping prism 3 to provide an isotropic light quantity distribution. Further, the light flux that is transmitted by the polarization beam splitter (PBS) 7 through a non-polarization beam splitter (NBS) 4 passes through a ¼ wavelength plate (QWP) 8, and is converted into a circularly polarized light from a linearly polarized light. The photodetector (LPC-PD) 6 receives the light flux that has been reflected by the non-polarization beam splitter (NBS) 4, and controls the output power of the semiconductor laser 1.

The light flux that has been transmitted by the ¼ wavelength plate 8 is input to the expander lens 9. The expander lens 9 corrects spherical aberration that occurs in an objective lens or an SIL which will be described later. The expander lens 9 is so adapted as to control an interval between two lenses according to the spherical aberration. The light flux from the expander lens 9 is input to the objective lens (rear lens 10).

An objective lens unit includes the objective lens (rear lens) 10 and the SIL (front lens) 11. The objective lens 10 and the SIL (front lens) 11 are held by a lens holder as will be described later. The lens holder is mounted on a 2-axis actuator (not shown) that drives two lenses integrally in a focus direction and in a tracking direction.

The SIL 11 is of two types shown in FIGS. 20 and 21. In FIG. 20, a light flux that has been focused by an objective lens (rear lens) 101 is collected on a bottom surface of a hemispherical lens SIL 102-a. The light flux is input perpendicularly to the spherical surface of the hemispherical lens, and then collected on the bottom surface through the same optical path as that in the case where there is no hemispherical lens. As a result, the wavelength is equivalently shortened by the refractive index of the hemispherical lens, and therefore the optical spot diameter is reduced.

That is, when it is assumed that the refractive index of the hemispherical lens is N, and the numeric aperture of the objective lens 101 is NA, a light spot corresponding to N×NA is obtained on the recording surface of the optical disc 103. For example, when the objective lens 101 of NA=0.7 is combined with the hemispherical lens SIL-102a, NAeff=1.4 is achieved when it is assumed that the effective NA is NAeff. An error of about 10 μm in the thickness of the hemispherical lens 102-a can be allowed, so the mass production is facilitated.

On the other hand, in FIG. 21, a light flux that has been focused by the objective lens (rear lens) 101 is collected on a bottom surface of an super-hemispherical lens SIL 102-b. The bottom surface is spaced apart from the center of the super-hemispherical lens SIL 102-b by R/N. When it is assumed that an angle defined between the optical axis and the light flux on the bottom surface is θt, the angle θt and an angle θi defined between the light flux that is input to the super-hemispherical lens SIL 102-b and the optical axis meet a relationship of Expression (1).

$$\sin \theta t = N \times \sin \theta i \quad (1)$$

Since sin θi is NA of the objective lens 101, the light spot corresponding to $N^2 \times NA$ is obtained on the recording surface of the optical disc 103, taking the fact that the light flux is collected in the SIL of the refractive index N into account. The NA of the objective lens 101 is limited to 1/N or lower through Expression (1) under the condition where the light flux can be input to SIL 102-b.

When super-hemispherical lens SIL 102-b is made of a material for glass lens of N=2, even if the objective lens 11 is formed of an objective lens of a relatively low NA, for example, NA=0.5, it is possible to obtain the light spot corresponding to NAeff=2.0. However, there arises a drawback that an error in the thickness of the super-hemispherical lens 102-b cannot be allowed to be higher than about 1 μm.

In any SIL, only in the case where the distance between the bottom surface of the SIL and the optical disc 103 is a short distance that is equal to or less than a fraction of divers of the wavelength 405 nm of the light source, for example, 100 nm or less, the light spot affects the recording surface from the bottom of SIL as an evanescent light, and recording/reproduction can be conducted by the light spot diameter of NAeff. In order to keep the above-mentioned distance, a gap servo is employed. The optical disc 12 of FIG. 19 is formed of a dual-layer disc having two recording layers which will be described later with reference to FIGS. 22 and 23.

Returning again to FIG. 19, an optical system of a return path will be described. The light flux that has been reflected by the dual-layer disc 12 becomes a circularly polarized light that is inversely rotated, and is input to the SIL 11 and the objective lens 10, and again converted into a collimated light flux. In addition, the light flux that has passed through the expander lens 9 and the ¼ wavelength plate 8 and has been linearly polarized in a direction orthogonal to the going path is reflected by the PBS 7, and then input to the ½ wavelength plate (HWP) 13.

On the other hand, an S polarized light component in the light flux whose polarization plane is rotated by 45° by the ½ wavelength plate (HWP) 13 is reflected by the polarization beam splitter 14, and then collected on the photodetector (PD1) 16 through the lens 15. Information on the optical disc 12 is reproduced from the RF output 17 of the photodetector (PD1) 16.

Further, a P polarized light component in the light flux whose polarization plane is rotated by 45° by the ½ wavelength plate (HWP) 13 is transmitted by the polarization beam splitter 14, reflected by the non-polarization beam splitter (NBS) 18, and then collected on the two-division photodetector (PD2) 20 through the lens 19 A tracking error 21 is obtained from an output signal of the two-division photodetector (PD2) 20.

On the other hand, the light flux of NAeff<1 that does not conduct total reflection among the light flux that is reflected by the bottom surface of SIL 11 is reflected as the circularly polarized light that rotates inversely to the input light as with the reflected light from the double-layer optical disc 12. The light flux of NAeff≧1 which occurs total reflection produces a phase difference δ which is represented by the following expression (2) between the P polarized light component and the S polarized light component, and forms an elliptically polarized light that is deviated from the circularly polarized light.

$$\tan(\theta/2) = \cos\theta i \times \sqrt{(N^2 \times \sin^2\theta i - 1)}/(N \times \sin^2\theta i) \quad (2)$$

Accordingly, when the light flux passes through the ¼ wavelength plate 8, the light flux includes the polarized light component in the same direction as the going path. The polarized light component is transmitted by the PBS 7, reflected by the NBS 4, and collected on the photodetector (PD3) 27 through the lens 26. The amount of light flux is monotonically more reduced as the distance between the bottom surface of the SIL and the dual-layer disc is shorter in the near field region, and therefore the polarized light component can be used as the gap error signal 28.

When a target threshold value is determined in advance, the gap servo is conducted such that the distance between the bottom surface of the SIL and the optical disc can be held to a desired distance of 100 nm or less. The gap servo is disclosed in detail in the above-mentioned article of Japan journal applied physics, vol. 44 (2005), pp. 3564 to 3567. Further, since the light flux is not modulated by the recording information on the optical disc 12, a stable gap error signal can be obtained regardless of the presence or absence of the recording information.

As described above, the super-hemispherical SIL has the advantage that NA can be easily increased. For example, when NAeff=2, recording of 150 GB can be conducted on the disc that is 120 mm in diameter. However, it is necessary to extremely severely control a manufacture error in the thickness of the lens SIL. Further, since the evanescent light does not reach the recording layer unless the refractive index of a protective layer that protects the recording layer is higher than NAeff, the material of the protective layer must be necessarily made of an inorganic material whose refractive index exceeds 2.

That is, in the super-hemispherical SIL, the protective layer made of the organic material, in which the protective layer can be coated by spin coat inexpensively but which is low in the refractive index (N=about 1.6), cannot be used. Since the protective layer that prevents the recording layer from being damaged by an abrasion requires at least about several μm, production of the protective layer by using the inorganic material requires high costs. Likewise, in the case of using the super-hemispherical SIL, it is difficult to provide a multi-layer structure that laminates plural recording layers on each other with an intermediate layer made of the organic material.

On the other hand, the spherical SIL has a limit of NAeff=about 1.5 from the viewpoint of the NA of the objective lens that can be used inexpensively. In this case, recording of 84 GB can be conducted on the disc that is 120 mm in diameter. However, since the refractive index of the protective layer that protects the recording layer can be selected to be about 1.6, it is possible to use the protective layer made of an inexpensive organic material.

Likewise, in the case of using the hemispherical SIL, it is possible to provide a multi-layer structure that laminates plural recording layers on each other with the intermediate layer made of the organic material. For example, the dual-layer disc is 168 GB in the recording capacity which is superior to a case using the super-hemispherical SIL of NAeff=2. In addition, a manufacture error of the hemispherical SIL is relatively so lax as to allow mass production. The comparison of those SIL is disclosed in detail in the above-mentioned article of Optical data storage 2004, proceedings of SPIE vol. 5380 (2004).

Now, a description will be given of the details of the dual-layer disc 12 and the hemispherical SIL with reference to FIGS. 22 and 23. In the drawings, the same symbols denote identical members. The dual-layer disc 12 has an L0 recording layer 12-2 disposed on a polycarbonate substrate 12-1. The L0 recording layer 12-2 has an information track and a track along which pits are defined.

On the L0 recording layer is disposed, for example, an L1 recording layer 12-4 having an information track and a track along which pits are formed through, for example, an intermediate layer 12-3 having a constant thickness of 3 μm which is made of 2P (photo polymer), likewise. In addition, on the L1 recording layer 12-4 is disposed, for example, a cover layer 12-5 having a constant thickness of 3 μm which is made of 2P (photo polymer).

The center of a sphere of a virtual hemispherical SIL 11 (the center of a circle indicated by a dotted line) is located substantially at the intermediate between the L0 recording layer 12-2 and the L1 recording layer 12-4. In the case where the light flux is focused on the L0 recording layer 12-2, an interval between the objective lens 10 and the SIL 11 is adjusted to d1 by a voice coil motor 201 as shown in FIG. 22. The light flux that has been collimated by the expander lens 9 passes through the objective lens 10 and the SIL 11, and is focused on the L0 recording layer that is located at a position slightly farther from the SIL than the virtual center of the above-mentioned sphere.

Further, in the case where the light flux is focused on the L1 recording layer 12-4, the interval between the objective lens 10 and the SIL 11 is adjusted to d2 (d2>d1) by the voice coil motor 201, as shown in FIG. 23. The light flux that has been collimated by the expander lens 9 passes through the objective lens 10 and the SIL 11, and is focused on the L1 recording layer 12-4 that is located at a position slightly closer from the SIL than the virtual center of the above-mentioned sphere.

Jump of the interlayer between the L0 recording layer and the L1 recording layer of the optical disc is conducted by controlling the objective lens 10 by the voice coil motor 201 and adjusting the interval between the objective lens 10 and the SIL 11, as shown in FIG. 23. This technique is disclosed in detail in the above-mentioned article of Optical data storage 2004, proceedings of SPIE vol. 5380 (2004).

The voice coil motor 201 that adjusts the interval between the objective lens 10 and the lens SIL 11 is mounted on a lens holder 202. The lens holder 202 is controlled such that the distance between the SIL 11 and the disc 12 is kept to a given value by a 2-axis actuator (not shown) according to the gap error signal 28. Further, the lens holder 202 is controlled such that the light spot tracks a desired track by the 2-axis actuator according to a tracking error signal 21.

The conventional optical information recording/reproducing apparatus for near field recording using the hemispherical SIL 11 and the dual-layer disc 12 suffers from the following problems. That is, the distance between the SIL and the disc is merely kept to a desired value according to the gap error signal. Therefore, in order to focus the light flux on the L0 layer or the L1 layer with precision, the focus error signal cannot be used, and it is necessary to always monitor the amplitude or the modulation degree of the tracking error signal or the RF signal. This is because the reflected light from the bottom surface of the SIL 11 is mixed with the focus error signal as a noise as described above.

Therefore, even though a slight thickness unevenness occurs in a cover layer or an intermediate layer of the disc, the light spot is incapable of tracking the unevenness rapidly, thereby making it difficult to record or reproduce information with precision. Further, even if the wavelength of the semiconductor laser changes due to a temperature change, the light flux is incapable of tracking the change of the wavelength quickly, thereby making it difficult to record or reproduce information with precision.

Further, in conducting interlayer jump, because the focus error signal cannot be referred to, it is difficult to conduct quick focus jump, and jump frequently fails.

SUMMARY OF THE INVENTION

The present invention has been made in view of the above-mentioned circumstances, and therefore, an object of the present invention is to provide an optical information recording/reproducing apparatus which is capable of preventing a reflected light from the bottom surface of an SIL from being mixed with a light flux that detects a focus error as a noise, to thereby focus the light flux on the basis of a focus error signal.

Specifically, the focus error signal is detected from the reflected light flux from a recording layer of an optical recording medium, and the light flux is focused on the recording layer of the optical recording medium on the basis of the focus error signal. In the case of detecting the focus error signal, the light flux of the effective numeric aperture NAeff<1 due to an objective lens and the SIL within a pupil is detected by a splitting device as the focus error signal. As a result, it is possible to suppress the reflected light from the bottom surface of the SIL from being mixed into the focus error signal as a noise Further features of the present invention will become apparent from the following description of exemplary embodiments with reference to the attached drawings.

DESCRIPTION OF THE PREFERRED EMBODIMENTS

Now, a description will be given in more detail of preferred embodiments of the present invention with reference to the accompanying drawings.

Embodiment 1

Figure 1:
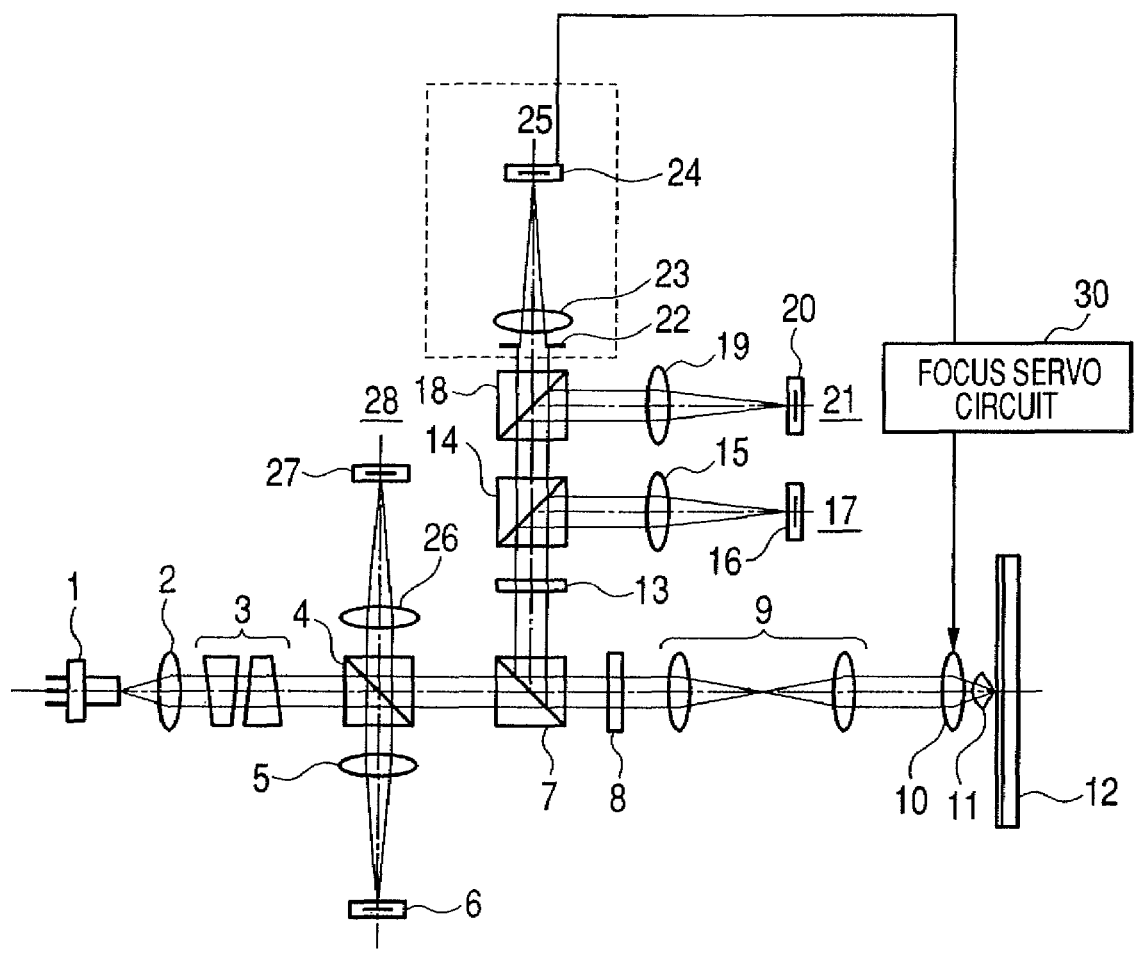
FIG. 1 is a structural diagram illustrating an optical information recording/reproducing apparatus according to Embodiment 1 of the present invention.
Figure 2:
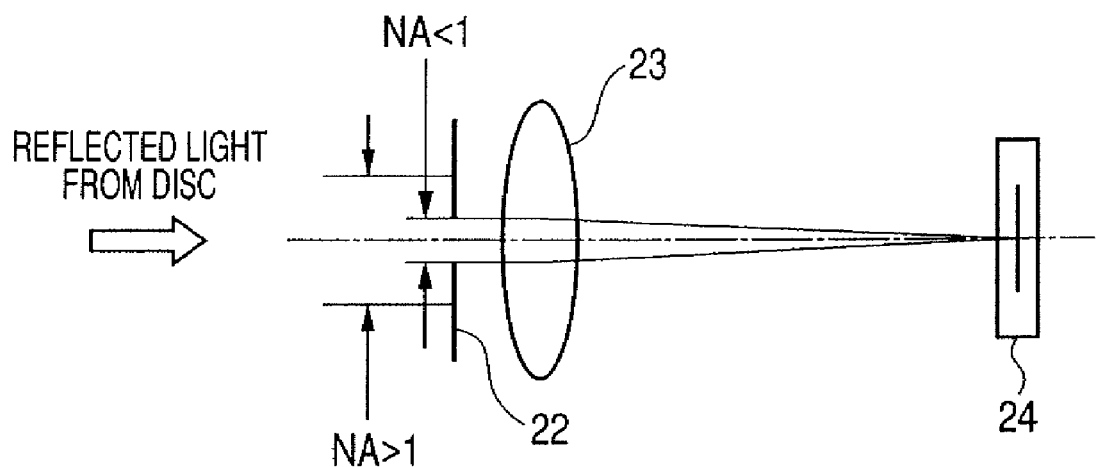
FIG. 2 is a diagram illustrating optical means for detecting a focus error signal according to the embodiment shown in FIG. 1 in detail.

Embodiment 1 of the present invention will be described with reference to FIGS. 1 to 3. FIG. 1 illustrates the configuration of an optical pickup for near field recording in an optical information recording/reproducing apparatus according to the present invention. In FIG. 1, the same parts as those in the conventional apparatus are denoted by identical symbols.

Further, FIG. 1 shows a focus servo control circuit 30, and a recording circuit and a reproducing circuit which are required to record or reproduce information on an optical disc, a servo control circuit, and a circuit and a mechanism that conduct seek control of an optical pickup are not shown in FIG. 1. Further, other circuits and mechanisms such as a motor that rotationally drives the optical disc and a controller that controls the respective parts within the apparatus are also not shown in FIG. 1.

A light flux that is output from a semiconductor laser 1 having a wavelength of 405 nm is converted into a collimated light flux by a collimator lens 2, and input to the beam shaping prism 3 to provide an isotropic light quantity distribution. The light flux that has been transmitted by the polarization beam splitter (PBS) 7 through the non-polarization beam splitter (NBS) 4 passes through the ¼ wavelength plate (QWP) 8, and is then converted into a circularly polarized light from the linearly polarized light.

There is also provided a photodetector (LPC-PD) 6 for receiving a light flux that has been reflected by the non-polarization beam splitter (NBS) 4 to control the output power of the semiconductor laser 1. The light flux that has passed through the ¼ wavelength plate (QWP) 8 is input to the expander lens 9. The expander lens 9 is adapted to correct the spherical aberration that occurs in the objective lens or the SIL so as to control the interval between those two lenses according to the spherical aberration.

The light flux from the expander lens 9 is input to the objective lens 10. The objective lens (rear lens) 10 and the SIL (front lens) 11 are held by the lens holder 202 as described with reference to FIGS. 22 and 23. The lens holder 202 is mounted on the 2-axis actuator that integrally drives the two lenses in the focus direction and in the tracking direction. Further, the voice coil motor 201 is held by the lens holder 202, and the objective lens 10 is moved in the focus direction by driving the voice coil motor 201.

Figure 20:
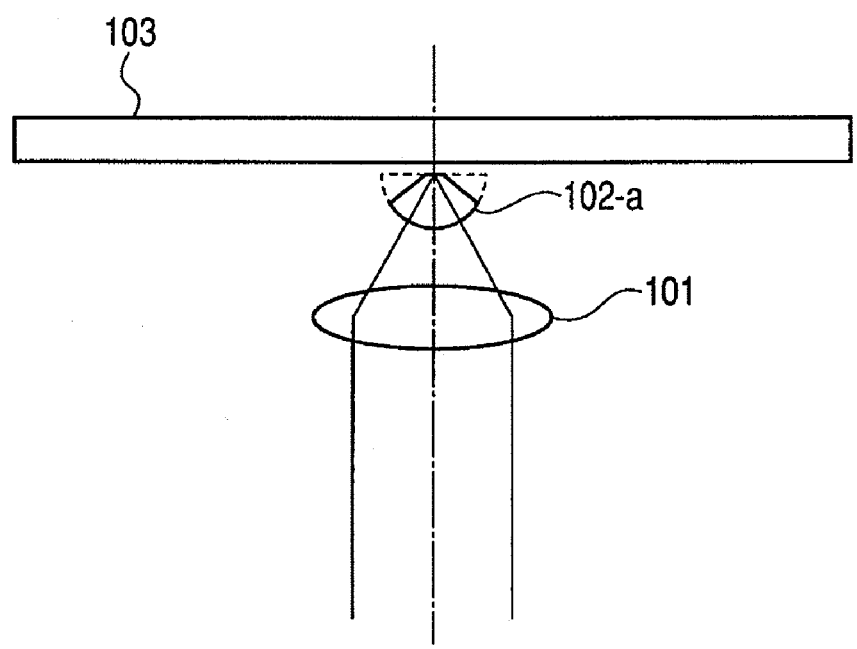
FIG. 20 is a diagram for explaining a hemispherical SIL in a conventional example.
Figure 21:
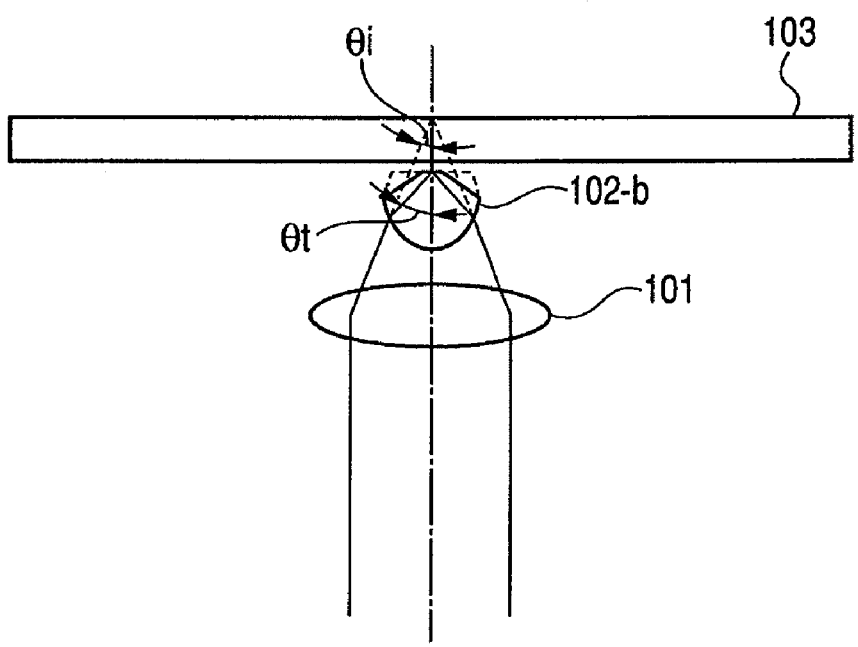
FIG. 21 is a diagram for explaining an super-hemispherical SIL in the conventional example.

The SIL is of the hemispherical type shown in FIG. 20. In this embodiment, the objective lens 10 of NA=0.7 is combined with the SIL 11 of the hemispherical lens SIL 11 to provide NAeff=1.4.

Figure 22:
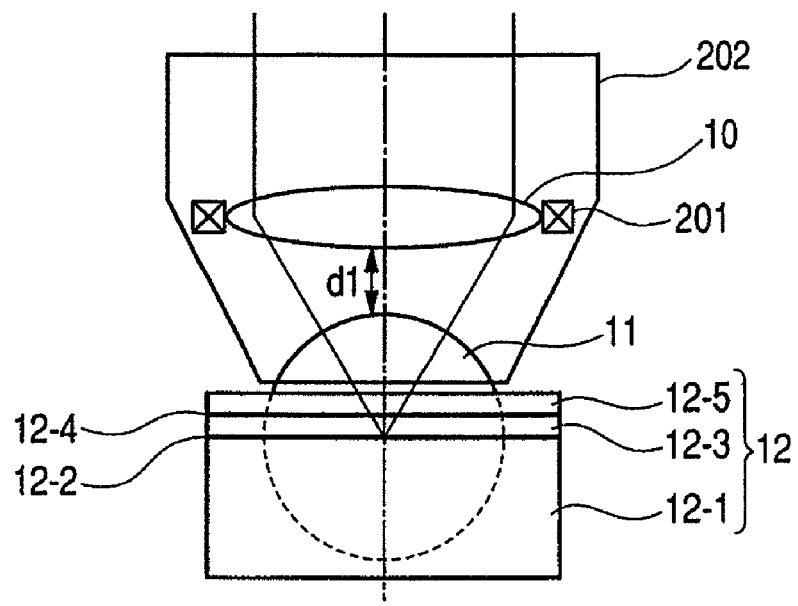
FIG. 22 is a diagram illustrating a case in which a light flux is focused on an L0 recording layer of a dual-layer disc in the conventional example.
Figure 23:
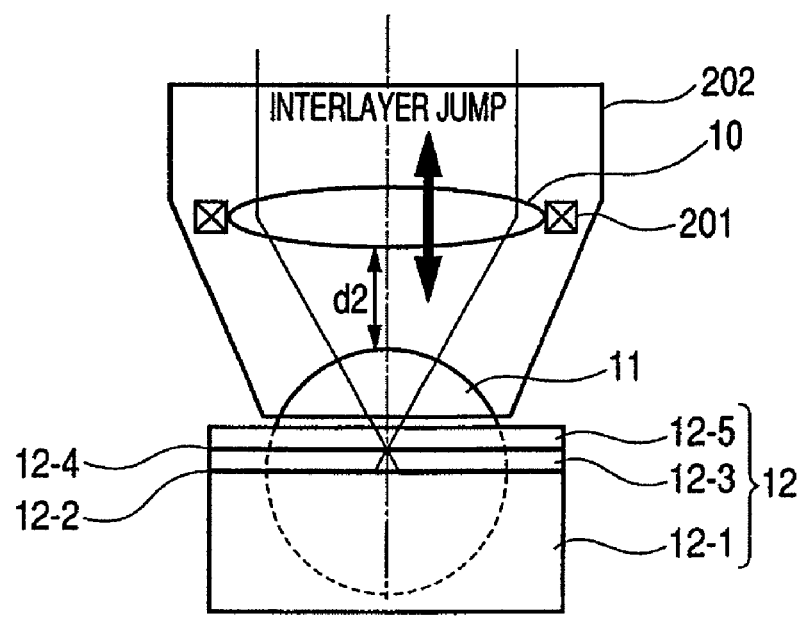
FIG. 23 is a diagram illustrating a case in which a light flux is focused on an L1 recording layer of the dual-layer disc in the conventional example.

For that reason, only in the case where the distance between the bottom surface of the SIL and the optical disc 12 is a short distance that is equal to or less than a fraction of divers of the wavelength 405 nm of the light source, for example, 100 nm or less, the light spot affects the recording surface from the bottom of SIL as an evanescent light, and recording or reproduction can be conducted with the light spot diameter of NAeff. In order to keep the above-mentioned distance, a gap servo is employed. The dual-layer disc 12 is formed of a dual-layer disc having two recording layers as shown in FIGS. 22 and 23.

The light flux that has been reflected by the optical disc 12 becomes a circularly polarized light that is inversely rotated, and is input to the SIL 11 and the objective lens 10, and again converted into a collimated light flux. In addition, the light flux that has passed through the expander lens 9 and the ¼ wavelength plate 8 and has been linearly polarized in a direction orthogonal to the going path is reflected by the PBS 7, and then input to the ½ wavelength plate (HWP) 13.

An S polarized light component in the light flux whose polarization plane is rotated by 45° by the ½ wavelength plate (HWP) 13 is reflected by the polarization beam splitter 14, and then collected on the photodetector (PD1) 16 through the lens 15. Information on the optical disc 12 is reproduced from the RF output 17 of the photodetector (PD1) 16.

On the other hand, a P polarized light component in the light flux whose polarization plane is rotated by 45° by the ½ wavelength plate (HWP) 13 is transmitted by the polarization beam splitter 14, reflected by the non-polarization beam splitter (NBS) 18, and then collected on the two-division photodetector (PD2) 20 through the lens 19. A tracking error 21 is obtained from an output signal of the two-division photodetector (PD2) 20.

Now, the configuration characterized by this embodiment will be described. The configuration is surrounded by a dotted line of FIG. 1. That is, the light flux that has passed through the non-polarization beam splitter 18 passes through an aperture 22, and an outer peripheral portion of the light flux is shielded from light Then, the light flux passes through a sensor lens 23, and is collected on the photodetector (PD4) 24. A focus error 25 is obtained from the output of the photodetector (PD4) 24.

The sensor lens 23 is, for example, a toric lens. The focus error 25 is obtained according to the output signal from the photodetector (PD4) 24 that is a quadrant photodetector through a known astigmatism method, and the light flux is focused on a desired recording layer by a focus servo control circuit 30.

Subsequently, the configuration surrounded by a dotted line of FIG. 1 will be described in more detail with reference to FIGS. 2 and 3. FIG. 2 shows the configuration surrounded by the dotted line shown in FIG. 1 in detail. The same symbols as those of FIG. 1 denote identical members with those of FIG. 1. The same is applied to the following figures. Referring to FIG. 2, the reflected light flux from the optical beam satisfies NA=1.4 (NA>1) in the peripheral portion of the pupil diameter. The aperture 22 allows the light flux of NA<1, for example, NA=about 0.85 in the center of the aperture 22 to be transmitted, and allows the light flux of NA>1 in the outer peripheral portion to be shielded.

The reason why the transmitted light flux is reduced to about 10% with respect to NA=1 is that the light flux that satisfies NA>1 in the outer peripheral portion is prevented from being mixed in the case where the objective lens 10 and the SIL 11 are moved in the disc radial direction with the eccentricity of the disc.

The diameter of the aperture 22 is preferably set to a range of NA=0.75 to 0.95. This is because the focus sensitivity is deteriorated as NA is remarkably reduced. The sensor lens 23 is a toric lens as described above, and the light flux is focused on a desired recording layer according to the output signal from the quadrant photodetector 24 through the astigmatism method.

Figure 3:
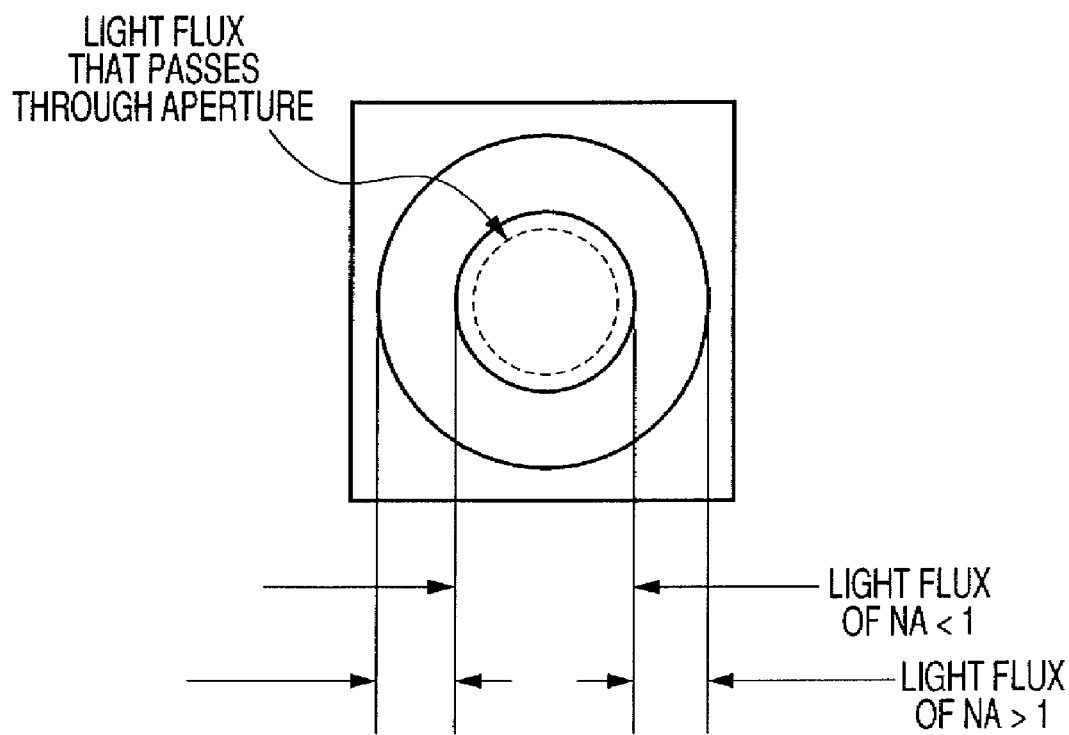
FIG. 3 is a diagram schematically illustrating the light quantity distribution within a pupil according to the embodiment shown in FIG. 1.

FIG. 3 schematically shows the light quantity distribution within the pupil. FIG. 3 shows a case in which the distance between the SIL and the optical disc is held to a distance that is equal to or less than a fraction of divers of the wavelength 405 nm, for example, 50 nm or less, by the gap servo. The annular portion of NA>1 contains a large quantity of reflected light from the bottom surface of the SIL, which is a noise of the focus signal. Accordingly, the aperture 22 allows the light flux of NA<1 or lower, for example, NA<0.85 which is an inside of the dotted line of FIG. 3 to be transmitted. The light flux of NA<1 or lower contains a large quantity of reflected light from the recording layer of the optical disc 12, thereby enabling focus information to be easily obtained. NA is an effective numerical aperture of the objective lens 10 and the SIL 11.

The objective lens 10 and the SIL (front lens) 11 are held by the lens holder 202 as in FIGS. 22 and 23, and the voice coil motor 201 that adjusts the interval between both the lenses is held on the lens holder 202.

Figure 19:
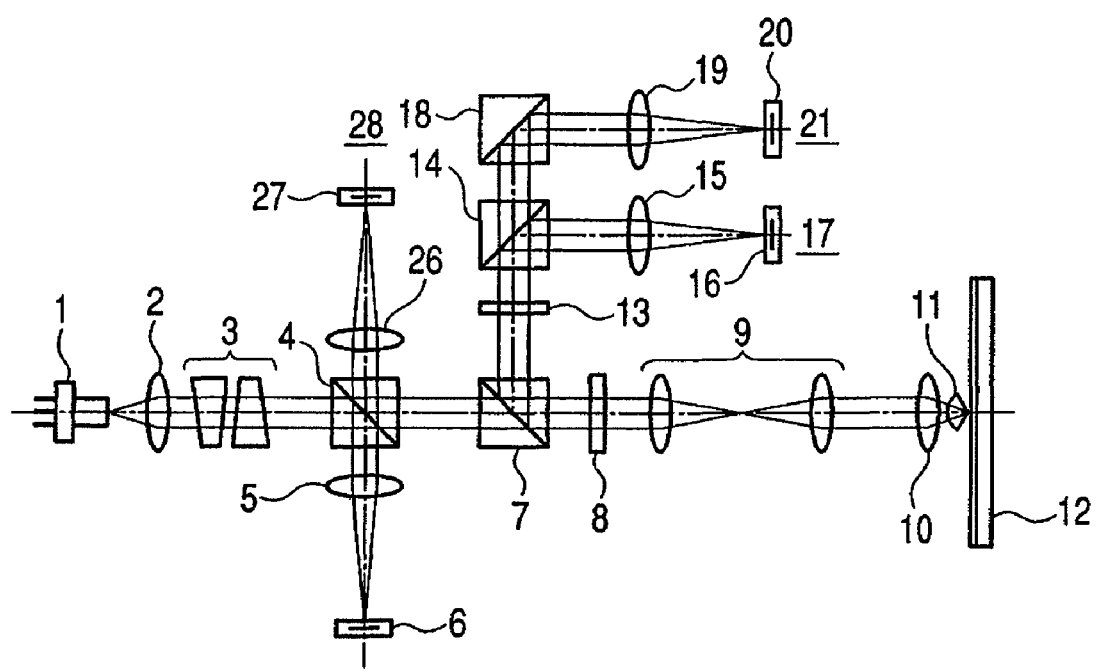
FIG. 19 is a structural diagram illustrating an optical information recording/reproducing apparatus for near field recording in a conventional example.

The lens holder 202 is adapted to move in the focus direction and the tracking direction by driving a 2-axis actuator (not shown), likewise. In the case where the gap servo is conducted, a gap servo circuit (not shown) controls the 2-axis actuator on the basis of the gap error signal 28 as in FIG. 19, to thereby hold the interval between the SIL 11 and the optical disc 12 to a given value The gap servo will be described later.

In the case where the tracking servo is conducted, the tracking servo circuit (not shown) controls the 2-axis actuator on the basis of the tracking error signal 21, to thereby scan an intended information track with a fine light spot from the semiconductor laser 1 under the control In the case where the interlayer jump of the optical disc 12 is conducted, the same method as that described with reference to FIGS. 22 and 23 is conducted. That is, the voice coil motor 201 is controlled to move the objective lens 10 in the optical axial direction, to thereby conduct the interlayer jump between the L0 recording layer and the L1 recording layer.

In this situation, in the case where the interlayer jump is conducted between the L0 recording layer and the L1 recording layer, the objective lens 10 is moved in the optical axial direction, and the interlayer jump is conducted with reference to the focus error signal in this situation. Because the focus error signal changes according to the recording layer by referring to the focus error signal, the focal positions of the respective recording layers (focus error=0) are found. Therefore, the interlayer jump is conducted between the focal positions of the recording layers while monitoring the focus error signal, thereby enabling rapid and accurate jumping. The interlayer jump is conducted under the control by a controller (not shown).

The focus servo is conducted in the same manner as that in the conventional focus servo of the single-layer disc or the dual-layer disc. In this embodiment, the focus error signal 25 is supplied to the focus servo circuit 30, and the voice coil motor 201 is controlled by the focus servo circuit 30. That is, the objective lens 10 is controlled in the focus direction by the focus servo circuit 30 such that the focus error signal becomes zero. As a result, the focus servo is conducted such that the fine light spot from the semiconductor laser 1 is focused on the L0 recording layer or the L1 recording layer of the optical disc 12.

In any cases, the reflected light flux from the recording layer passes through the objective lens 10 and the SIL 11, and is collimated by the expander lens 9, and the position of the sensor lens 23 is adjusted in advance such that the focus error signal at that time becomes zero.

In this embodiment, because the light flux is precisely focused on the L0 recording layer or the L1 recording layer of the optical disc according to the focus error signal, even if a slight thickness unevenness occurs in the cover layer or the intermediate layer of the optical disc, it is possible to follow the thickness unevenness rapidly, thereby enabling accurate information recording or reproduction. Further, even if the wavelength of the semiconductor laser 1 changes due to the temperature change, it is possible to follow the change in the wavelength rapidly, thereby enabling accurate information recording or reproduction. In addition, in conducting the interlayer jump, because the focus error signal can be referred to, the rapid focus jump can be conducted, and no jump fails.

On the other hand, the light flux of NAeff<1 that does not conduct total reflection among the light flux that is reflected by the bottom surface of SIL 11 is reflected as the circularly polarized light that is inversely rotated to the input as with the reflected light from the optical disc 12. In the light flux of NAeff≧1 which occurs total reflection, the light flux produces a phase difference δ which is represented by Expression (2) between the P polarized light component and the S polarized light component of the reflected light, and forms an elliptically polarized light that is deviated from the circularly polarized light. Thus, the light flux contains the polarized light component in the same direction as with the going path after passing through the ¼ wavelength plate 8.

The polarized light component is transmitted by the polarization beam splitter (PBS) 7, reflected by the non-polarization beam splitter (NBS) 4, and collected on the photodetector (PD3) 27 through the lens 26. The light quantity of the light flux is monotonously reduced more as the distance between the bottom surface of the SIL and the optical disc is shorter in the near field region, and therefore can be used as the gap error signal 28.

When the target threshold value is determined in advance, the 2-axis actuator is driven to conduct the gap servo, thereby enabling the distance between the bottom surface of the SIL and the optical disc to be held to a desired distance of 100 nm or less. Further, the gap error signal 28 can be normalized according to the output of the photodetector (LPC-PD) 6 for controlling the output power of the semiconductor laser 1.

As described above, according to the present invention, the aperture 22 (splitting device) for guiding the light flux of NAeff<1 into the light receiving device is disposed. As a result, although there is the possibility that the light flux other than NAeff<1 may enter the light receiving device due to the assembling error, the influence is small in obtaining the focus error signal without deviating from the main features of the present invention. The same is applied to the following embodiments.

Embodiment 2

Figure 4:
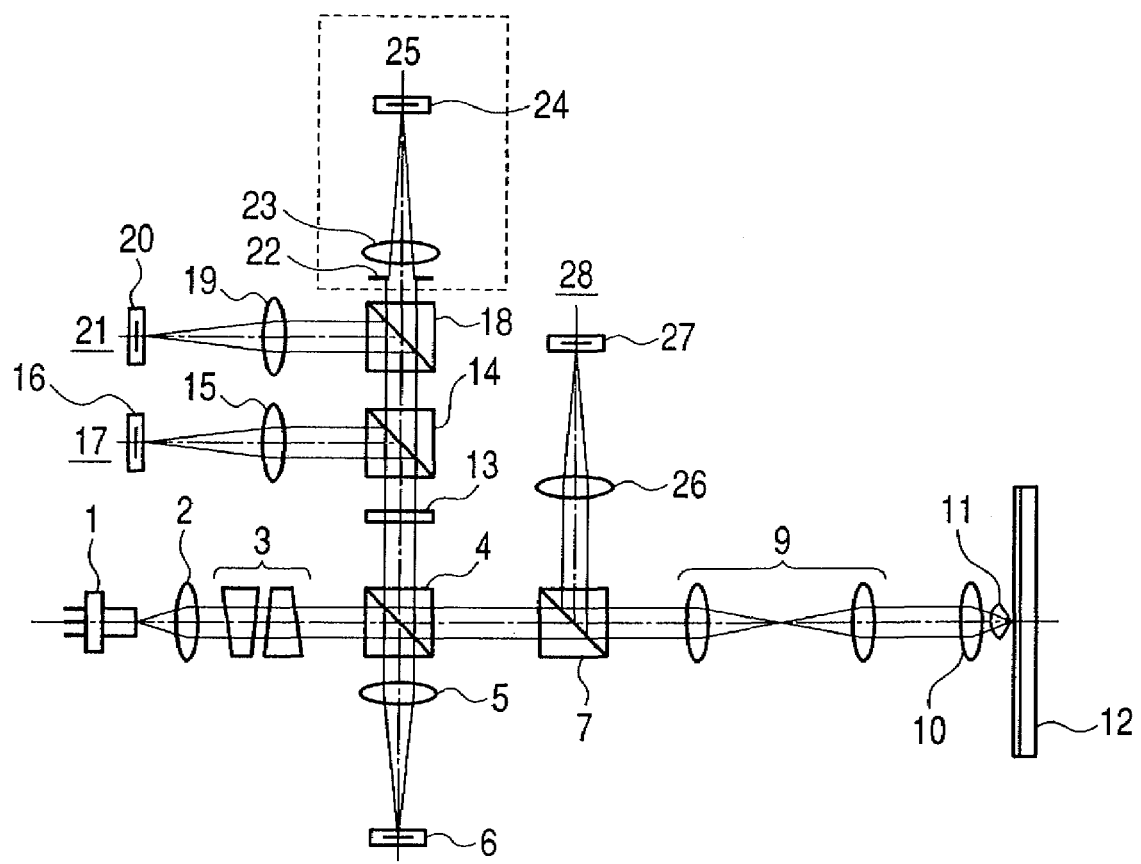
FIG. 4 is a structural diagram illustrating Embodiment 2 of the present invention.

FIG. 4 is a structural diagram showing Embodiment 2 of the present invention. In FIG. 4, the same parts as those of FIG. 1 are denoted by identical symbols. Likewise, a focus servo control circuit 30, and a recording circuit and a reproducing circuit which are required to record or reproduce information on an optical disc, a servo control circuit, and a circuit and a mechanism that conduct seek control of an optical pickup are not shown in FIG. 4. Further, the focus servo circuit 30 is not shown in FIG. 4. Further, other circuits and mechanisms such as a motor that rotationally drives the optical disc and a controller that controls the respective parts within the apparatus are well known, and therefore are not shown in FIG. 4.

A light flux that is output from a semiconductor laser 1 having a wavelength of 405 nm is converted into a collimated light flux by a collimator lens 2, and input to the beam shaping prism 3 to provide an isotropic light quantity distribution. The light flux that has been transmitted by the polarization beam splitter (PBS) 7 through the non-polarization beam splitter (NBS) 4 is input to the expander lens 9. The expander lens 9 is adapted to correct the spherical aberration that occurs in the objective lens or the SIL so as to control the interval between those two lenses according to the spherical aberration. There is also provided a photodetector (LPC-PD) 6 for receiving a light flux that has been reflected by the non-polarization beam splitter (NBS) 4 to control the output power of the semiconductor laser 1.

The light flux from the expander lens 9 is input to the objective lens 10. The objective lens 10 and the SIL 11 are held by the lens holder, likewise. The lens holder is mounted on the 2-axis actuator (not shown) that integrally drives the two lenses in the focus direction and in the tracking direction. Likewise, the SIL is of the hemispherical type shown in FIG. 20. In this embodiment, the objective lens 10 of NA=0.7 is combined with the SIL 11 of the hemispherical lens of N=2 to provide NAeff=1.4.

For that reason, only in the case where the distance between the bottom surface of the SIL and the optical disc 12 is a short distance that is equal to or less than a fraction of divers of the wavelength 405 nm of the light source, for example, 100 nm or less, the light spot affects the recording surface from the bottom of SIL as an evanescent light. Therefore, recording/reproduction can be conducted by the light spot diameter of NAeff. In order to keep the above-mentioned distance, the above-mentioned gap servo is employed. Likewise, the dual-layer disc 12 is formed of an optical disc having two recording layers as shown in FIGS. 22 and 23.

The light flux that has been reflected by the optical disc 12 is input to the SIL 11 and the objective lens 10, and again converted into a collimated light flux. In addition, the light flux that has passed through the expander lens 9 and has been linearly polarized in a direction identical with the going path is transmitted by the PBS 7, reflected by the NBS 4, and then input to the ½ wavelength plate (HWP) 13.

An S polarized light component in the light flux whose polarization plane is rotated by 45° by the ½ wavelength plate (HWP) 13 is reflected by the polarization beam splitter 14, and then collected on the photodetector (PD1) 16 through the lens 15. Information on the optical disc 12 is reproduced from the RF output 17 of the photodetector (PD1) 16.

On the other hand, a P polarized light component in the light flux whose polarization plane is rotated by 45° by the ½ wavelength plate (HWP) 13 is transmitted by the polarization beam splitter 14, reflected by the non-polarization beam splitter (NBS) 18, and then collected on the two-division photodetector (PD2) 20 through the lens 19 A tracking error 21 is obtained from an output signal of the two-division photodetector (PD2) 20.

The characteristic point of this embodiment resides in the configuration surrounded by the dotted line shown in FIG. 4. That is, the light flux that has been transmitted by the non-polarization beam splitter 18 passes through the aperture 22, and an outer peripheral portion (NA>1) of the light flux is shielded from light. Then, the light flux passes through the sensor lens 23, and is collected on the photodetector (PD4) 24 through the sensor lens 23. The focus error 25 is obtained from the output signal of the photodetector (PD4) 24.

The sensor lens 23 is, for example, a toric lens, and detects the focus error signal according to the output signal from the quadrant photodetector (PD4) 24 through the known astigmatism method. The configuration surrounded by the dotted line is identical with that in Embodiment 1, and therefore their description will be omitted.

The focus servo is conducted in the same manner as that in Embodiment 1. The focus error signal 25 is supplied to the focus servo circuit 30, and the voice coil motor 201 is controlled by the focus servo circuit 30. That is, the objective lens 10 is controlled in the focus direction by the focus servo circuit 30 such that the focus error signal becomes zero. As a result, the focus servo is conducted such that the fine light spot from the semiconductor laser 1 is focused on the L0 recording layer or the L1 recording layer of the optical disc 12.

Gap servo, the tracking servo, and the interlayer jump are identical with those in Embodiment 1, and therefore their detailed description will be omitted.

Likewise, in this embodiment, because the light flux is precisely focused on the L0 recording layer or the L1 recording layer of the optical disc according to the focus error signal, even if a slight thickness unevenness occurs in the cover layer or the intermediate layer of the optical disc, it is possible to follow the thickness unevenness rapidly, thereby enabling accurate information recording or reproduction. Further, even if the wavelength of the semiconductor laser 1 changes due to the temperature change, it is possible to follow the change in the wavelength rapidly, thereby enabling accurate information recording or reproduction. In addition, in conducting the interlayer jump, because the focus error signal can be referred to, the rapid focus jump can be conducted, and no jump fails.

On the other hand, the light flux of NAeff<1 that does not conduct total reflection among the light flux that is reflected by the bottom surface of SIL 11 is reflected as the linearly polarized light that is substantially the same as that at the time of inputting the light flux as with the reflected light from the optical disc 12. In the light flux of NAeff≧1 which occurs total reflection, the light flux that is input to the bottom of the SIL at an azimuth other than the input polarization direction and a direction orthogonal to the input polarization direction produces a phase difference δ which is represented by Expression (2) between the P polarized light component and the S polarized light component of the reflected light, and forms an elliptically polarized light that is deviated from the circularly polarized light. Thus, the light flux contains the polarized light component in the direction orthogonal to the going path.

The polarized light component is reflected by the PBS 7 and collected on the photodetector (PD3) 27 through the lens 26. The light quantity of the light flux is monotonously reduced more as the distance between the bottom surface of the SIL and the optical disc is shorter in the near field region, and therefore can be used as the gap error signal 28.

When the target threshold value is determined in advance, the 2-axis actuator is driven to conduct the gap servo, thereby enabling the distance between the bottom surface of the SIL and the optical disc to be held to a desired distance of 100 nm or less. Further, the gap error signal 28 can be normalized according to the output of the photodetector (LPC-PD) 6 for controlling the output power of the semiconductor laser 1.

In the above embodiment, the double-layer recording medium having the two recording layers is used. However, the present invention is not limited to the above configuration, but is applicable to a recording medium having one recording layer or a recording medium having two or more recording layers.

Embodiment 3

This embodiment provides an optical information recording/reproducing apparatus that is capable of precisely focusing the light flux on the double-layer optical disc according to the focus error signal, and also is capable of correcting the spherical aberration at the same time so as to enable the rapid and stable interlayer jumping operation.

Figure 5:
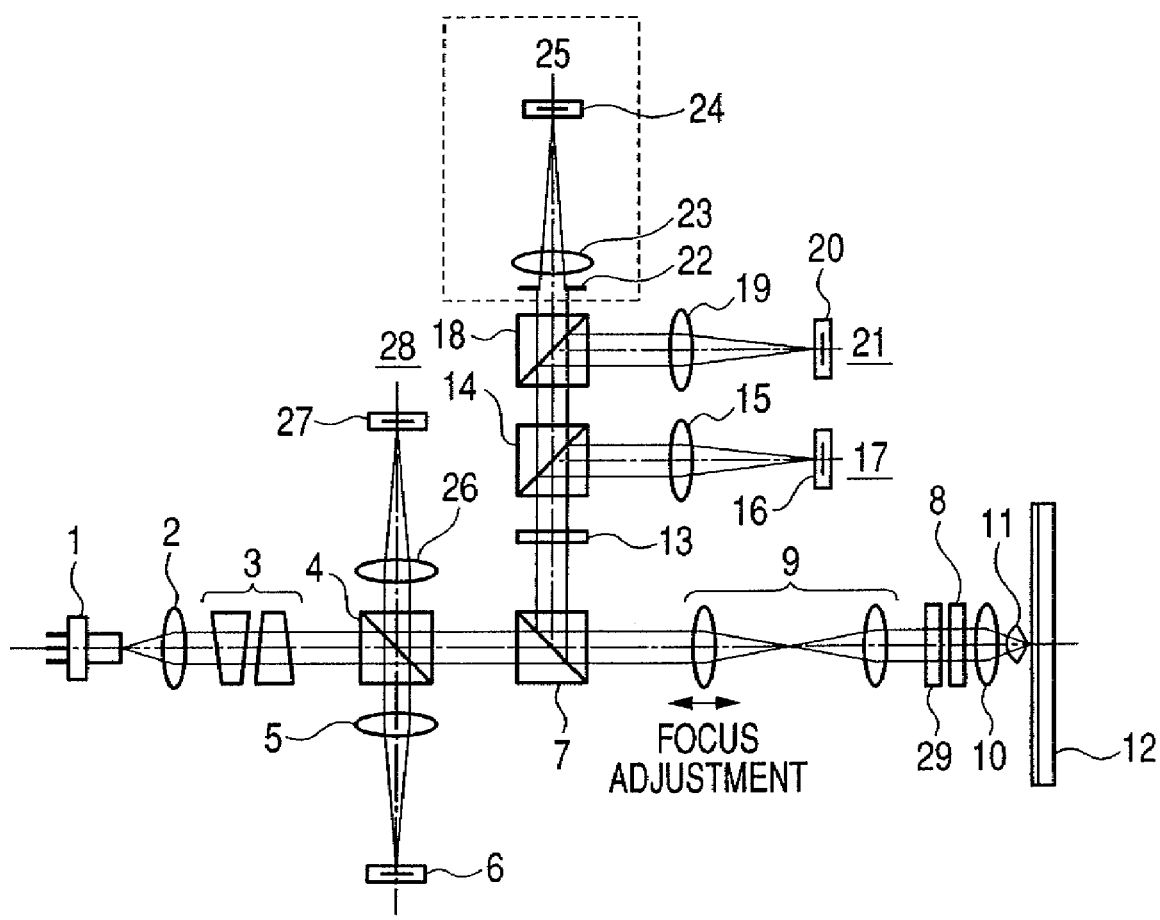
FIG. 5 is a diagram for explaining Embodiment 3 of the present invention.

Embodiment 3 of the present invention will be described with reference to FIGS. 5 to 8. FIG. 5 is a diagram for explaining the configuration of the optical information recording/reproducing apparatus for near field recording according to the present invention.

A light flux that is output from a semiconductor laser 1 having a wavelength of 405 nm is converted into a collimated light flux by the collimator lens 2, and input to the beam shaping prism 3 to provide an isotropic light quantity distribution. The light flux that has been transmitted by the polarization beam splitter (PBS) 7 through the non-polarization beam splitter (NBS) 4 is input to the expander lens 9. There is provided a photodetector (LPC-PD) 6 for receiving a light flux that has been reflected by the non-polarization beam splitter (NBS) 4 to control the output power of the semiconductor laser 1.

Further, the expander lens 9 is so adapted as to control the interval between those two lenses according to the focus error 25 that will be described later. The light flux from the expander lens passes through the liquid crystal device 29 and the ¼ wavelength plate (QWP) 8, and is converted into the circularly polarized light from the linearly polarized light. A voltage is applied to the liquid crystal device 29 so as to generate the inverse phase of the spherical aberration that occurs at the respective focal positions of the dual-layer disc 12 as will be described later. The light flux that has been transmitted by the ¼ wavelength plate is inputted to the rear lens 10 of the objective lens.

An objective lens unit includes the objective lens (rear lens) 10 and the SIL (front lens) 11. The objective lens 10 and the SIL (front lens) 11 are mounted on a 2-axis actuator (not shown) that drives two lenses integrally in a focus direction and in a tracking direction, together with the liquid crystal device 29 and the ¼ wavelength plate 8. The SIL is of the hemispherical type described with reference to FIG. 20. In this embodiment, the objective lens (rear lens) 10 of NA=0.7 is combined with the SIL 11 of the hemispherical lens of N=2 to meet NAeff=1.4.

A focusing method according to one of the characteristics of the present invention is identical with the portion surrounded by the dotted line of FIG. 1 which is described in Embodiment 1 and the contents described with reference to FIGS. 2 and 3, and its description will be omitted.

Figure 6:
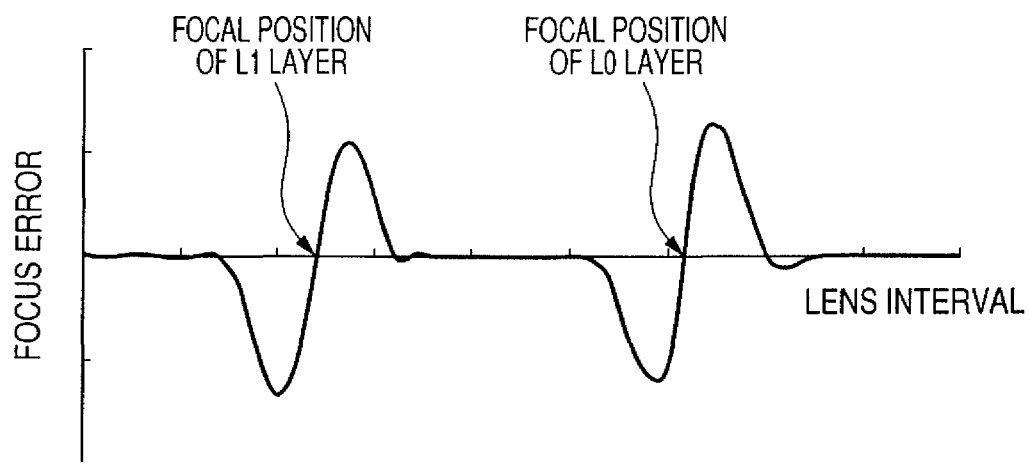
FIG. 6 is a diagram for explaining a focus error that is obtained by a dual-layer disc according to the present invention.

Further, referring to FIG. 5, the focus error signal 25 allows the interval between two lenses of the expander lens 9 to be changed under the gap servo, to thereby obtain a signal shown in FIG. 6 in correspondence with the L0 layer and the L1 layer. Therefore, in conducting the interlayer jump, the interval between the two lenses of the expander lens 9 is changed with reference to the focus error 25 to move between the focal position of the L0 layer and the focal position of the L1 layer.

Further, in a state where the light flux is focused on the L0 layer and the L1 layer, there occurs a large difference in the spherical aberration quantity due to the difference in the layer thickness and the increased NA. In order to solve that drawback, a correcting method and a correction mechanism for the spherical aberration according to another characteristic of the present invention will be described with reference to FIGS. 7 and 8.

Figure 7:
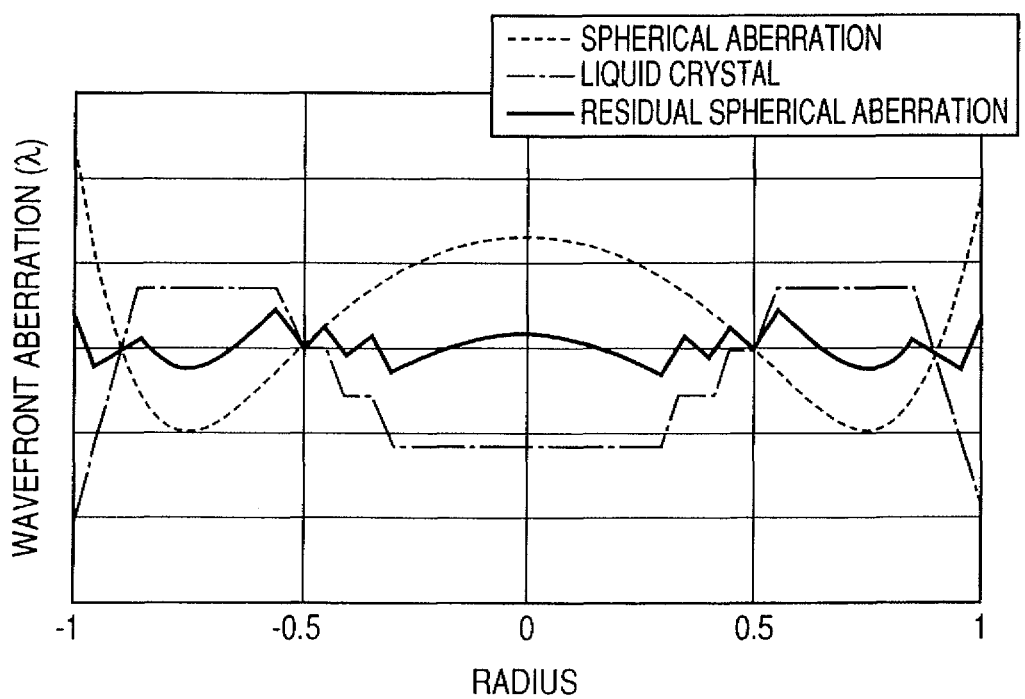
FIG. 7 is a diagram for explaining spherical aberration correction of a liquid crystal device according to the present invention.

FIG. 7 is an explanatory diagram showing a case in which the spherical aberration is corrected by the liquid crystal device, and schematically shows the appearance of correction.

An axis of abscissa of FIG. 7 represents a radius of a standardized light flux, and an axis of ordinate represents the spherical aberration quantity. Of three lines, a dotted line represents the spherical aberration before correction, a broken line represents the spherical aberration to be corrected, and a solid line represents after the correction. As is found from the solid line of FIG. 7, the spherical aberration is corrected by using the liquid crystal device, thereby enabling the spherical aberration to be reduced.

Figure 8A:
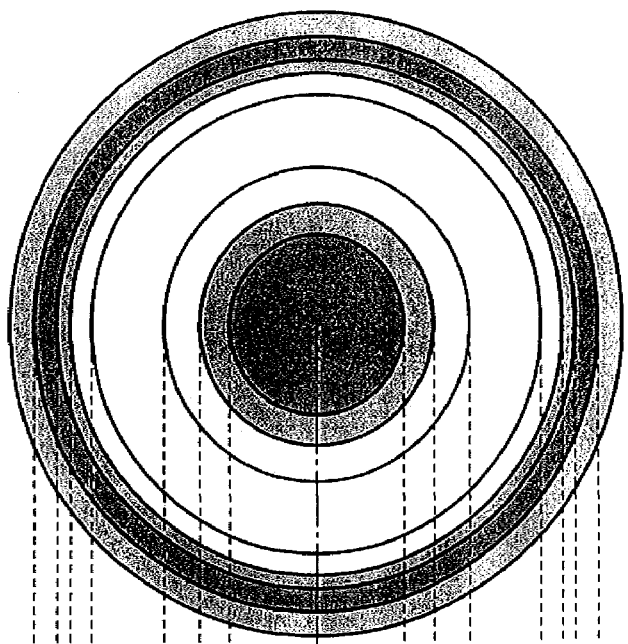
FIGS. 8A and 8B are diagrams for explaining an electrode of the liquid crystal device according to the present invention.
Figure 8B:
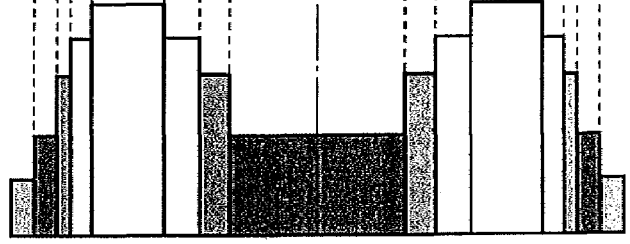

FIG. 8A is a schematic diagram showing the electrode of the liquid crystal device used in FIG. 7, and FIG. 8B is a schematic diagram showing the correction quantity of the spherical aberration in the liquid crystal device. FIGS. 8A and 8B show the electrode of the liquid crystal device which conducts the aberration correction of eight divisions at five stages as an example. However, the number of stages and the number of divisions are not limited to this embodiment. The voltage across the electrode of the liquid crystal device is controlled to generate the inverse phases of the spherical aberration quantities which are generated in the optical system of the optical information recording/reproducing apparatus for near field recording at the focal position of the L0 layer and the focal position of the L1 layer in the near liquid crystal, respectively. Thus, the spherical aberrations are corrected at the focal positions of the respective layers. The configuration can be simplified in such a manner that the spherical aberration quantities that are generated in the liquid crystal device at the focal position of the L0 layer and the focal position of the L1 layer have two values that are identical in absolute value with each other and different in sign from each other, and the symbols are merely changed over.

Further, the light flux of NAeff<1 that does not conduct total reflection among the light flux that is reflected by the bottom surface of SIL 11 is reflected as the circularly polarized light that rotates inversely to the input light as with the reflected light from the optical disc 12. The light flux of NAeff≧1 which causes total reflection produces a phase difference δ which is represented by Expression (2) between the P polarized light component and the S polarized light component, and forms an elliptically polarized light that is deviated from the circularly polarized light. Thus, when the light flux passes through the ¼ wavelength plate 8, the light flux contains the polarized light component in the same direction as that of the going path. The polarized light component is transmitted by the PBS 7 and reflected by the NBS 4, and collected on the photodetector (PD3) 27 through the lens 26. The light quantity of the light flux is monotonously reduced more as the distance between the bottom surface of the SIL and the optical disc is shorter in the near field region, and therefore can be used as the gap error signal 28. When the target threshold value is determined in advance, the 2-axis actuator is driven to conduct the gap servo, thereby enabling the distance between the bottom surface of the SIL and the optical disc to be held to a desired distance of 100 nm or less.

Further, the gap error signal 28 can be normalized according to the output of the photodetector (LPC-PD) 6 for controlling the output power of the semiconductor laser 1.

According to the present invention, since the focus error signal can be used in order to precisely focus the light flux on the L0 recording layer or the L1 recording layer, even if a slight thickness unevenness occurs in the cover layer or the intermediate layer, it is possible to follow the thickness unevenness rapidly by the lens interval variable drive of the expander lens. At the same time, because the spherical aberration is corrected by the liquid crystal device, it is possible to conduct the accurate information recording or reproduction. Further, even if the wavelength of the semiconductor laser 1 changes due to the temperature change, it is possible to follow the change in the wavelength rapidly by controlling the lens interval variable drive of the expander lens. In that case, the spherical aberration generated on the basis of the controlling may be also corrected by the liquid crystal device. However, because the spherical aberration quantities on the basis of the controlling is unknown, it is necessary to provide a detection system which optically detects the spherical aberration quantities, thereby enabling accurate information recording or reproduction.

In addition, in conducting the interlayer jump, because the focus error signal can be referred to, focusing is conducted by the lens interval variable drive of the expander lens, and at the same time, the spherical aberration is corrected under the control of the voltage that is applied to the liquid crystal device. For that reason, there can be provided an apparatus which is capable of conducting the rapid and stable focus jump and has the excellent recording/reproducing characteristic.

Embodiment 4

Figure 9:
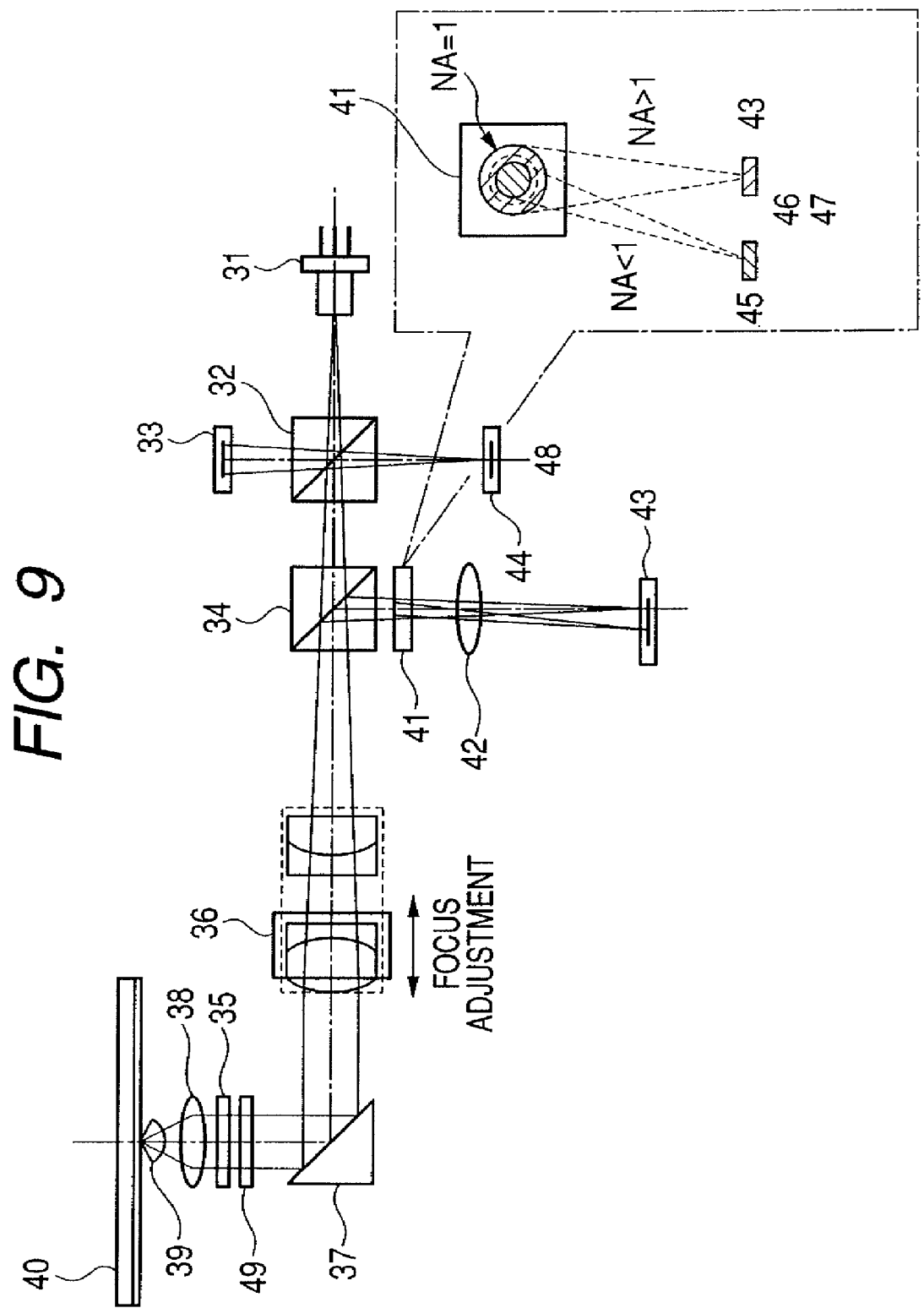
FIG. 9 is a diagram for explaining an optical information recording/reproducing apparatus for near field recording according to Embodiment 4 of the present invention.

A description will be given of the configuration of an optical information recording/reproducing apparatus for near field recording according to Embodiment 4 of the present invention with reference to FIG. 9. In FIG. 9, reference numeral 31 denotes a semiconductor laser, 32 is an NBS, 33 is an LPC-PD, 34 is a PBS, 35 is a QWP, 36 is an expander lens, 37 is a mirror, 38 is an objective lens, 39 is an SIL, 40 is a dual-layer disc, 41 is a hologram, 42 is a lens, 43 is a PD, 44 is a PD, 45 is a focus error, 46 is a tracking error, 47 is an RF output, 48 is a gap error, and 49 is a liquid crystal device.

A light flux that has been output from the semiconductor laser 31 having a wavelength of 405 nm is input to the polarization beam splitter (PBS) 34 through the non-polarization beam splitter (NBS) 32. There is provided the photodetector (LPC-PD) 33 for receiving a light flux that has been reflected by the non-polarization beam splitter (NBS) 32 to control the output power of the semiconductor laser 31. The light flux that has been transmitted by the polarization beam splitter (PBS) 34 is inputted to the expander lens 36.

The expander lens 36 is so adapted as to control the interval between those two lens groups according to the focus error 45 that will be described later. The expander lens 36 also has a collimator function that substantially collimates the light flux. The light flux from the expander lens 36 is transmitted by the liquid crystal device 49, and then input to the ¼ wavelength plate (QWP) 35. The light flux that has been transmitted by the ¼ wavelength plate (QWP) 35 is converted into the circularly polarized light from the linearly polarized light, and then input to the rear lens 38 of the objective lens. The objective lens includes the rear lens 38 and the SIL (front lens) 39. The rear lens 38 and the SIL (front lens) 39 are mounted on a 2-axis actuator (not shown) that drives those two lenses integrally in a focus direction and in a tracking direction. The SIL is of the hemispherical type described with reference to FIG. 20. The objective lens (rear lens) 38 of NA=0.7 is combined with the SIL 11 of the hemispherical lens of N=2 to provide NAeff=1.4.

Only in the case where the distance between the bottom surface of the SIL and the optical disc 40 is a short distance that is equal to or less than a fraction of divers of the wavelength 405 nm of the light source, for example, 100 nm or less, the light spot affects the recording surface from the bottom of the SIL as an evanescent light. Therefore, recording/reproduction can be conducted by the light spot diameter of NAeff. In order to keep the above distance, the above-mentioned gap servo is employed as in Embodiment 1. Further, the optical disc 40 is a dual-layer disc having two recording layers.

The light flux that has been reflected by the optical disc 40 is converted into a circularly polarized light that is inversely rotated, input to the SIL 39 and the objective lens 38, and again converted into a collimated light flux. The light flux that has passed through the ¼ wavelength plate 35, the liquid crystal device 49, and the expander lens 36 and has been linearly polarized in a direction orthogonal to the return path is reflected by the PBS 34.

The reflected light flux is divided into a light flux of NA<1 and a light flux in the periphery of the former light flux by the hologram 41, and input to the photodetector (PD) 43. The focus error 45 is outputted by the light flux of NA<1, and the tracking error 46 and the RF output 47 are outputted by the light flux in the periphery of the former light flux. In this embodiment, specifically, it is preferable that the light flux of NA<1 is set to a range of NA=0.75 to 0.95 in the aperture diameter as in Embodiment 1.

Further, the light flux that has been transmitted by the PBS 34 and reflected by the non-polarization beam splitter (NBS) 32 is inputted to the photodetector (PD) 44 to output the gap error 48. The gap control method is identical with that in the above-mentioned Embodiment 1.

As described above, the interval between those two lens groups of the expander lens 36 are controlled according to the focus error 45, the light flux is focused on the desired recording layer, and the spherical aberration is corrected by the voltage control of the liquid crystal device 49. For that reason, in conducting the interlayer jump, the interval between the two lens groups of the expander lens 36 and the applied voltage of the liquid crystal device 49 are changed to move between the focal position of the L0 layer and the focal position of the L1 layer as in Embodiment 1.

Similarly, according to this embodiment of the present invention, the focus error signal can be used in order to precisely focus the light flux on the L0 recording layer or the L1 recording layer. As a result, even if a slight thickness unevenness occurs in the cover layer or the intermediate layer, it is possible to follow the thickness unevenness rapidly by the lens interval variable drive of the expander lens and the control of the voltage that is applied to the liquid crystal device. As a result, the precise information recording or reproduction can be performed. Further, even if the wavelength of the semiconductor laser 1 changes due to the temperature change, it is possible to follow the change in the wavelength rapidly by controlling the lens interval variable drive of the expander lens. In that case, the spherical aberration generated on the basis of the controlling may be also corrected by the liquid crystal device. However, because the spherical aberration quantities on the basis of the controlling is unknown, it is necessary to provide a detection system which optically detects the spherical aberration quantities, thereby enabling accurate information recording or reproduction.

In addition, in conducting the interlayer jump, because the focus error signal can be referred to, the rapid and stable focus jumping operation can be conducted by the lens interval variable drive of the expander lens and the control of the voltage that is applied to the liquid crystal device. As a result, there can be provided an apparatus having an excellent recording/reproduction characteristic.

Further, in this embodiment, since the expander lens 36 has a collimator function that substantially collimates the light flux, the PBS or the NBS can be disposed between the semiconductor laser and the expander lens, which is useful in downsizing the apparatus.

Embodiment 5

Figure 24:
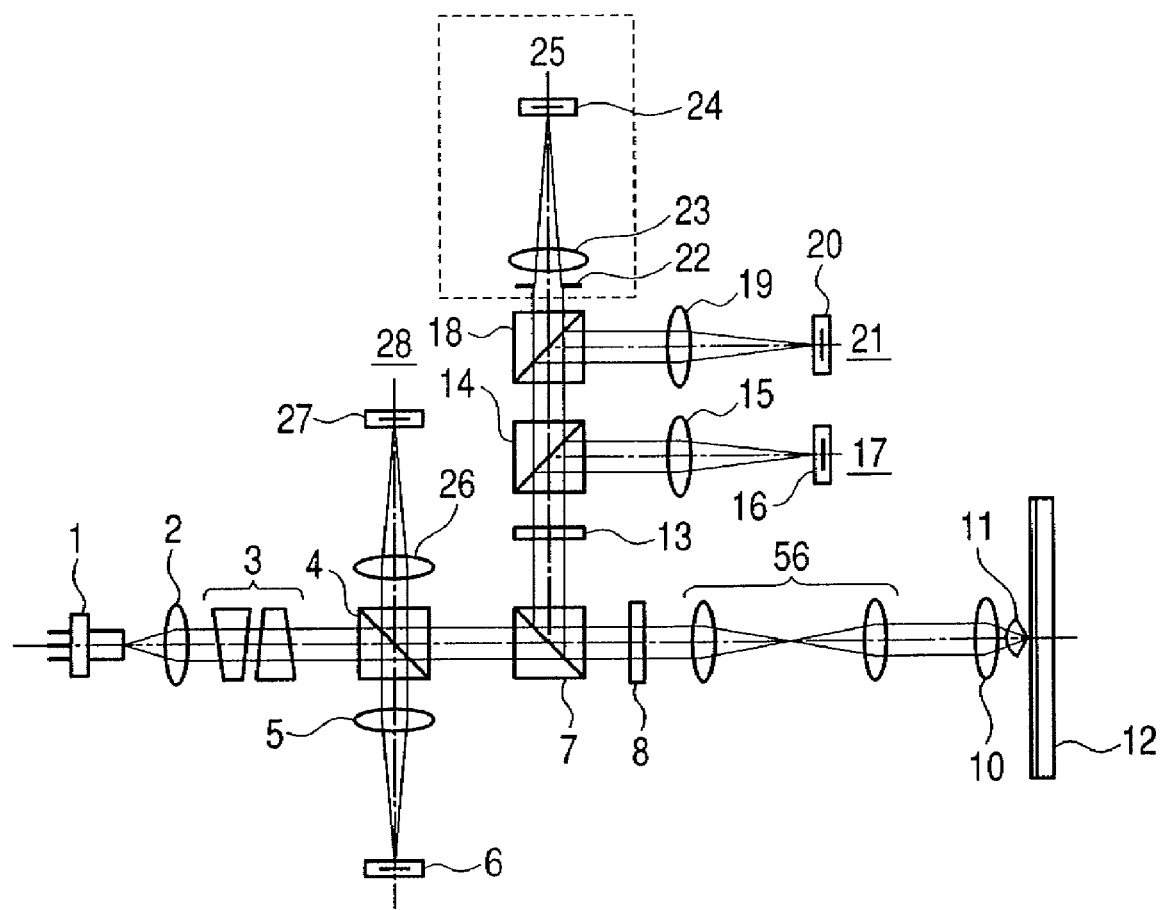
FIG. 24 is a structural diagram illustrating an optical information recording/reproducing apparatus according to Embodiment 5 of the present invention.

Embodiment 5 of the present invention will be described with reference to FIGS. 24, 2 to 3, and 10. FIG. 24 is a diagram showing the configuration of an optical pickup for near field recording in an optical information recording/reproducing apparatus according to the present invention. Further, a recording circuit and a reproducing circuit, which are required to record or reproduce information on an optical disc, a servo control circuit (including the focus servo circuit 30), and a circuit and a mechanism that conduct seek control of an optical pickup are not shown in FIG. 24. Further, the focus servo circuit 30 is not shown in FIG. 24. Further, other circuits and mechanisms such as a motor that rotationally drives the optical disc and a controller that controls the respective parts within the apparatus are not also shown in FIG. 24.

A light flux that has been output from a semiconductor laser 1 having a wavelength of 405 nm is converted into a collimated light flux by the collimator lens 2, and input to the beam shaping prism 3 to provide an isotropic light quantity distribution. Further, the light flux that has been transmitted by the polarization beam splitter (PBS) 7 through the non-polarization beam splitter (NBS) 4 passes through the ¼ waveform plate (QWP) 8, and is converted into the circularly polarized light from the linearly polarized light.

There is provided a photodetector (LPC-PD) 6 for receiving a light flux that has been reflected by the non-polarization beam splitter (NBS) 4 to control the output power of the semiconductor laser 1. The light flux that has been transmitted by the ¼ wavelength plate (QWP) 8 is input to the expander lens 56. The expander lens 56 is so adapted as to control the interval between those two lenses according to the focus error 25 that will be described later.

The spherical aberration that occurs in the objective lens 10 and the SIL 11 is corrected in advance when the objective lens (rear lens) 10 and the SIL (front lens) 11 are assembled integrally. The light flux from the expander lens 9 is input to the objective lens 10.

Now, a description will be given of the confirmation surrounded by a dotted line of FIG. 24. The light flux that has been transmitted by the non-polarization beam splitter (NBS) 18 passes through the aperture 22, and an outer peripheral portion of the light flux is shielded from light. Then, the light flux passes through the sensor lens 23, and is collected on the photodetector (PD4) 24. The focus error 25 is obtained from the output of the photodetector (PD4) 24, and the interval between the two lenses of the expander lens 56 is controlled according to the focus error 25 to focus the light flux on a desired recording layer.

The portion surrounded by the dotted line will be described in more detail with reference to FIGS. 2 and 3. Referring to FIG. 2, the reflected light flux from the optical disc meets NA=1.4 (NA>1) in the peripheral portion of the pupil diameter. The aperture 22 allows the light flux of NA<1, for example, NA=about 0.85 in the center of the aperture 22 to be transmitted, and allows the light flux of NA>1 in the outer peripheral portion to be shielded. The reason why the transmitted light flux is reduced to about 10% with respect to NA=1 is that the light flux that satisfies NA>1 in the outer peripheral portion is prevented from being mixed in the case where the objective lens 10 and the SIL 11 are moved in the disc radial direction with the eccentricity of the disc. The NA is the effective numerical aperture of the objective lens 10 and the SIL 11.

The diameter of the aperture 22 is preferably set to a range of NA=0.75 to 0.95. This is because the focus sensitivity is deteriorated as NA is remarkably reduced. The sensor lens 23 is a toric lens, and the light flux is focused on a desired recording layer according to the output signal from the photodetector (PD4) 24 that is a quadrant photodetector through the known astigmatism method In this case, the expander lens 56 has a structure in which one of the lenses is movable in the optical axis direction. For example, the drive source, such as an electromagnetic actuator, and the one of the lenses can be moved in the optical axis direction by a guide mechanism for guiding the lens in the optical axis direction. In this manner, by making the lens interval of the expander lens 56, the focus servo and the interlayer jump are conducted.

In the case of conducting the focus servo, the focus servo circuit 30 conducts the focus servo such that the fine light spot from the semiconductor laser 1 is focused on the L0 recording layer or the L1 recording layer of the optical disc 12 on the basis of the focus error signal.

FIG. 3 schematically shows the light quantity distribution within the pupil. FIG. 3 shows a case in which the distance between the SIL and the optical disc is held to a distance that is equal to or less than a fraction of divers of the wavelength 405 nm, for example, 50 nm by the gap servo. The annular portion of NA>1 contains a large quantity of reflected light from the bottom surface of the SIL, which is a noise of the focus signal.

Accordingly, the aperture 22 allows the light flux of NA<1 or lower, for example, NA<0.85 which is an inside of the dotted line to be transmitted. The light flux of NA<1 or lower contains a large quantity of reflected light from the recording layer of the optical disc 12, thereby enabling focus information to be easily obtained.

Figure 10:
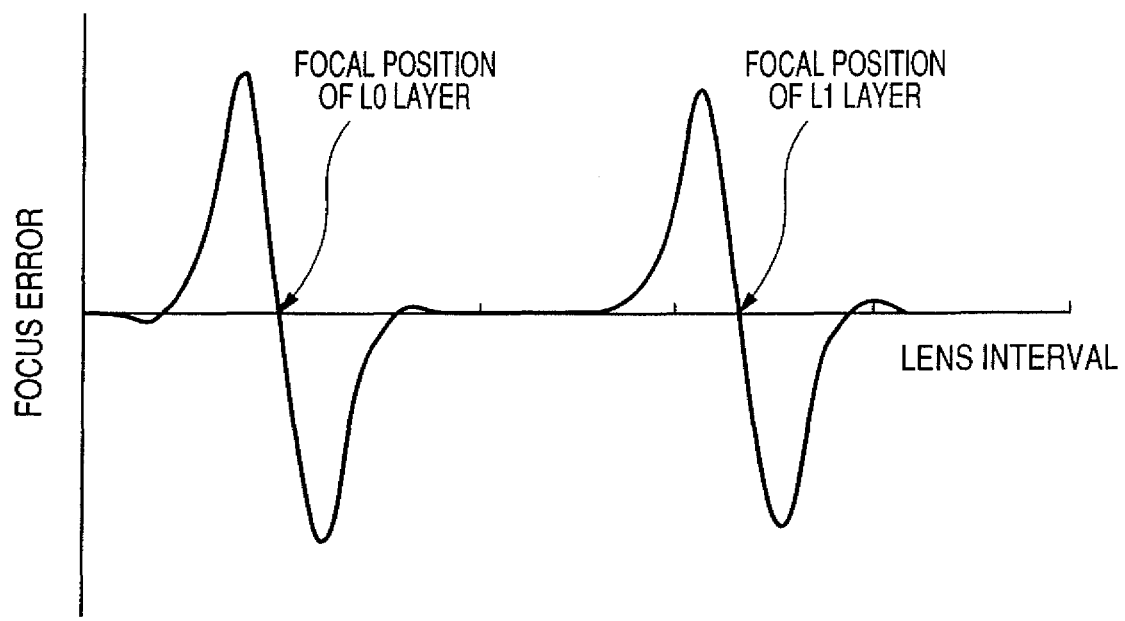
FIG. 10 is a diagram illustrating a focus error signal that is obtained by a dual-layer disc shown in FIG. 1.

FIG. 10 illustrates a focus error signal 25 in the case where the lens interval of the expander lens 9 is variable. The focus error signal 25 allows the interval between the two lenses of the expander lens 56 to be changed under the gap servo. As a result, the focus error signal changes in correspondence with the L0 recording layer and the L1 recording layer as shown in FIG. 10, and the focusing positions (focal positions) at the respective recording layers are found.

Accordingly, in the case where the interlayer jump of the optical disc 12 is conducted, a controller not shown monitors the focus error signal 25 shown in FIG. 10 while changing the interval between the two lenses of the expander lens 56, and conducts the interlayer jump between the focal position of the L0 recording layer and the focal position of the L1 recording layer. With the above-mentioned operation, it is possible to conduct the interlayer jump rapidly and accurately.

On the other hand, the light flux of NAeff<1 that does not conduct total reflection among the light flux that is reflected by the bottom surface of SIL 11 is reflected as the circularly polarized light that rotates inversely to the input light as with the reflected light from the optical disc 12. The light flux of NAeff≧1 which occurs total reflection produces a phase difference δ which is represented by Expression (2) between the P polarized light component and the S polarized light component, and forms an elliptically polarized light that is deviated from the circularly polarized light. Thus, when the light flux passes through the ¼ wavelength plate 8, the light flux contains the polarized light component in the same direction as that of the going path.

The polarized light component is transmitted by the polarization beam splitter (PBS) 7, reflected by the non-polarization beam splitter (NBS) 4, and collected on the photodetector (PD3) 27 through the lens 26. The light quantity of the light flux is monotonously reduced more as the distance between the bottom surface of the SIL and the optical disc is shorter in the near field region, and therefore can be used as the gap error signal 28.

When the target threshold value is determined in advance, the 2-axis actuator is driven to conduct the gap servo, thereby enabling the distance between the bottom surface of the SIL and the optical disc to be held to a desired distance of 100 nm or less. Further, the gap error signal 28 can be normalized according to the output of the photodetector (LPC-PD) 6 for controlling the output power of the semiconductor laser 1. The gap servo is not shown in FIG. 1, but is conducted by a gap servo circuit.

According to this embodiment, the light flux can be precisely focused on the L0 recording layer or the L1 recording layer of the optical disc according to the focus error signal. For that reason, even if a slight thickness unevenness occurs in the cover layer or the intermediate layer of the optical disc, it is possible to follow the thickness unevenness rapidly by the lens interval variable drive of the expander lens 56. As a result, it is possible to conduct the precise information recording or reproduction.

Further, even if the wavelength of the semiconductor laser changes due to the temperature change, it is possible to follow the change in the wavelength rapidly by the lens interval variable drive of the expander lens, thereby enabling accurate information recording or reproduction. Further, in conducting the interlayer jump, because the focus error signal is referred to, the interlayer jumping operation can be conducted rapidly and stably.

Embodiment 6

Figure 11:
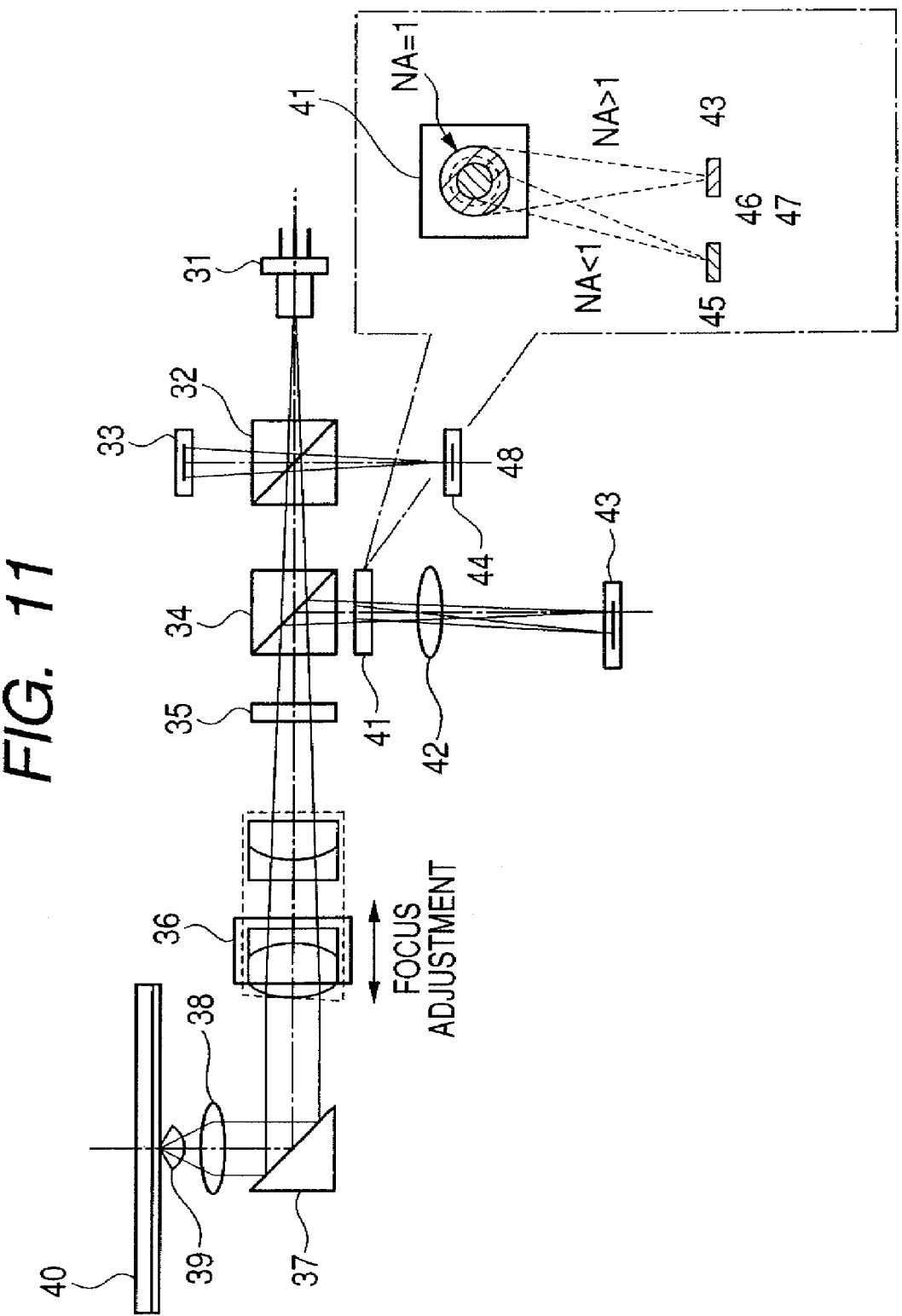
FIG. 11 is a diagram illustrating Embodiment 6 of the present invention.

The configuration of an optical pickup for near field recording according to Embodiment 6 of the present invention will be described with reference to FIG. 11. In FIG. 11, a recording circuit and a reproducing circuit, which are required to record or reproduce information on an optical disc, focus and tracking servo control circuits, and a circuit and a mechanism which conduct the seek control of an optical pickup are not shown in FIG. 11. Further, other circuits and mechanisms such as a motor that rotationally drives the optical disc and a controller that controls the respective parts within the apparatus are well known, and therefore are not shown in FIG. 11. Further, the same portions as those of FIG. 9 are already denoted by identical symbols.

A light flux that has been output from the semiconductor laser 31 having a wavelength of 405 nm passes through the non-polarization beam splitter (NBS) 32, and is input to the polarization beam splitter (PBS) 34. Further, the light flux that has been transmitted by the beam splitter (PBS) 34 passes through the ¼ waveform plate (QWP) 35, and is converted into the circularly polarized light from the linearly polarized light. There is provided a photodetector (LPC-PD) 33 for receiving a light flux that has been reflected by the non-polarization beam splitter (NBS) 32 to control the output power of the semiconductor laser 31.

The light flux that has been transmitted by the ¼ wavelength plate (QWP) 35 is input to the expander lens 36. The expander lens 36 is so adapted as to control the interval between two lens groups according to the focus error 45. The expander lens 36 also has a collimator function that substantially collimates the light flux.

As described above, the objective lens unit includes the rear lens 38 and the SIL (front lens) 39, and in this embodiment, the rear lens is the objective lens 38. The spherical aberration that occurs in the objective lens 38 and the SIL 39 is corrected in advance when the objective lens 38 and the SIL (front lens) 39 are assembled integrally.

The light flux from the expander lens 36 is input to the objective lens 38. The objective lens 38 and the SIL 39 are held by the lens holder 202 as in FIGS. 22 and 23. The lens holder 202 is mounted on the 2-axis actuator (not shown) that integrally drives the two lenses in the focus direction and in the tracking direction.

The SIL is of the hemispherical type shown in FIG. 20. The objective lens 38 of NA=0.7 is combined with the SIL 11 of the hemispherical lens of N=2 to provide NAeff=1.4.

For that reason, only in the case where the distance between the bottom surface of the SIL and the optical disc 40 is a short distance that is equal to or less than a fraction of divers of the wavelength 405 nm of the light source, for example, 100 nm or less, the light spot affects the recording surface from the bottom of the SIL as an evanescent light. Therefore, recording/reproduction can be conducted by the light spot diameter of NAeff. In order to keep the above-mentioned distance, the gap servo is employed as in Embodiment 1. The optical disc 40 is formed of a dual-layer disc having two recording layers as shown in FIGS. 22 and 23.

The light flux that has been reflected by the optical disc 40 is converted into a circularly polarized light that is inversely rotated, input to the SIL 39 and the objective lens 38, and again converted into a collimated light flux. In addition, the light flux that has passed through the expander lens 36 and the ¼ wavelength plate (QWP) 35 and has been linearly polarized in a direction orthogonal to the going path is reflected by the polarization beam splitter (PBS) 34, and input to the hologram 41.

The light flux is separated into a light flux of NA<1 and a light flux in the periphery of the former light flux by the hologram 41, and then input to the photodetector (PD) 43 through the lens 42. The focus error 45 is obtained from the signal in a sensor region that receives the light flux of NA<1 among the outputs of the photodetector (PD) 43, and the tracking error 46 and the RF output 47 are obtained from the signal in the sensor region that receives the light flux of the peripheral portion. Information of the optical disc 40 is reproduced from the RF output 47.

In this embodiment, specifically, the light flux of NA<1 can be set to a range of NA=0.75 to 0.95 in the aperture diameter as in Embodiment 1.

Further, the light flux that has been transmitted by the polarization beam splitter (PBS) 34 and reflected by the non-polarization beam splitter (NBS) 32 is inputted to the photodetector (PD) 44. The gap error 48 is obtained from the output of the photodetector (PD) 44. The gap servo method is identical with that in Embodiment 5.

In this embodiment, the interval between those two lens groups of the expander lens 36 are controlled on the basis of the focus error signal 45 as Embodiment 5, to thereby focus the light flux on a desired recording layer. A method of changing the interval between the lens groups of the expander lens 36 is also identical with that in Embodiment 5.

Further, in conducting the interlayer jump, the focus error signal 45 is monitored while changing the interval between the two lens groups of the expander lens 36 as in Embodiment 5, and the interlayer jump is conducted between the focal position of the L0 recording layer and the focal position of the L1 recording layer.

Likewise, in this embodiment, the light flux is focused on the L0 recording layer or the L1 recording layer of the optical disc on the basis of the focus error signal. For that reason, even if a slight thickness unevenness occurs in the cover layer or the intermediate layer of the optical disc, it is possible to follow the thickness unevenness rapidly by the lens interval variable drive of the expander lens. As a result, it is possible to conduct the precise information recording or reproduction.

Further, even if the wavelength of the semiconductor laser changes due to the temperature change, it is possible to follow the change in the wavelength rapidly by the lens interval variable drive of the expander lens, thereby enabling accurate information recording or reproduction. Further, in conducting the interlayer jump, because the focus error signal is referred to similarly, the interlayer jumping operation can be conducted rapidly and stably.

Further, in this embodiment, since the expander lens 36 has a collimator function that substantially collimates the light flux, the PBS or the NBS can be disposed between the semiconductor laser and the expander lens, which is useful in downsizing the apparatus.

In the above embodiment, the optical recording medium having the two recording layers is exemplified. However, the present invention is not limited to this configuration, but is capable of using the optical recording medium having two or more layers.

Embodiment 7

Hereinafter, a description will be given in detail of an embodiment of the present invention with reference to the accompanying drawings.

Figure 12:
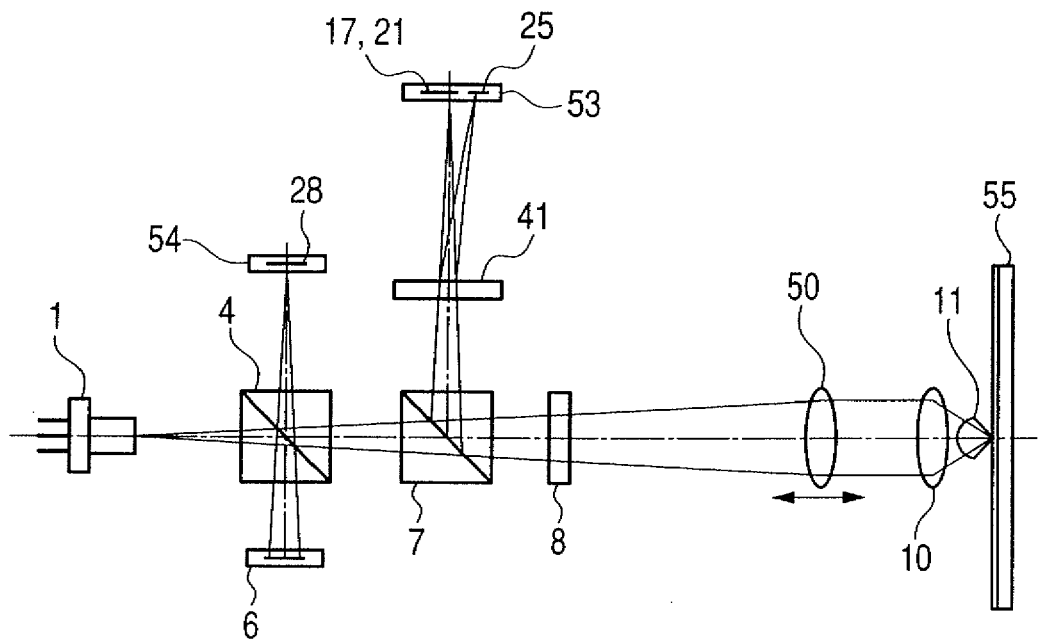
FIG. 12 is a diagram illustrating Embodiment 7 of the present invention.

One embodiment of the present invention will be described with reference to FIGS. 12 and 13. The same portions as those in FIG. 11 are denoted by identical symbols. FIG. 12 is a diagram for explaining the configuration of the optical pickup for near field recording according to the present invention.

A light flux that has been output from a semiconductor laser 1 having a wavelength of 405 nm passes through the polarization beam splitter (PBS) 7 and the ¼ wavelength plate (QWP) 8 through the non-polarization beam splitter (NBS) 4 such as a half mirror, and is converted into a circularly polarized light from the linearly polarized light. The light flux that has been reflected by the non-polarization beam splitter (NBS) 4 is directed toward the photodetector (LPC-PD) 6 for controlling the output power of the semiconductor laser 1. The light flux that has been transmitted by the QWP 8 is input to the expander lens 50 having the collimator lens, converted into a collimated light flux, and input to the rear lens 10 of the objective lens. The expander lens 50 is adapted to be movable along the optical axis of the going path by a voice coil motor or rack (not shown). Further, the expander lens is moved along the optical axial direction on the basis of the focus error signal that will be described later to focus the light flux on the recording layer of the optical disc 55. The recording layer of the optical disc 55 can be a single layer or plural layers. The objective lens unit includes the objective lens 10 and the SIL (front lens) 11. The objective lens 10 and the SIL (front lens) 11 are mounted on a 2-axis actuator (not shown) that drives those two lenses integrally in a focus direction and in a tracking direction. The SIL is made of a material that is larger in refractive index N than 1, and the SIL of the hemispherical type described with reference to FIG. 20 is used. The objective lens (rear lens) 10 of NA=0.7 is combined with the SIL 11 of the hemispherical lens of N=2 to provide NAeff=1.4.

Only in the case where the distance between the bottom surface of the SIL and the optical disc 55 is a short distance that is equal to or less than a fraction of divers of the wavelength 405 nm of the light source, for example, 100 nm or less, the light spot affects the recording surface from the bottom of the SIL as an evanescent light. Therefore, recording/reproduction can be conducted by the light spot diameter of NAeff. In order to keep the above-mentioned distance, the above-mentioned gap servo is employed.

The light flux that has been reflected by the optical disc 55 is converted into a circularly polarized light that is inversely rotated, input to the SIL 11 and the objective lens 10, and again converted into a collimated light flux. The collimated light flux passes through the expander lens 50 into a focal light, and passes through the QWP 8 into a linearly polarized light in a direction orthogonal to the going path, and is then reflected by the PBS 7. The light flux that has been reflected by the PBS 7 is input to the hologram 41. The hologram 41 has a hologram pattern shown in FIG. 13.

Figure 13:
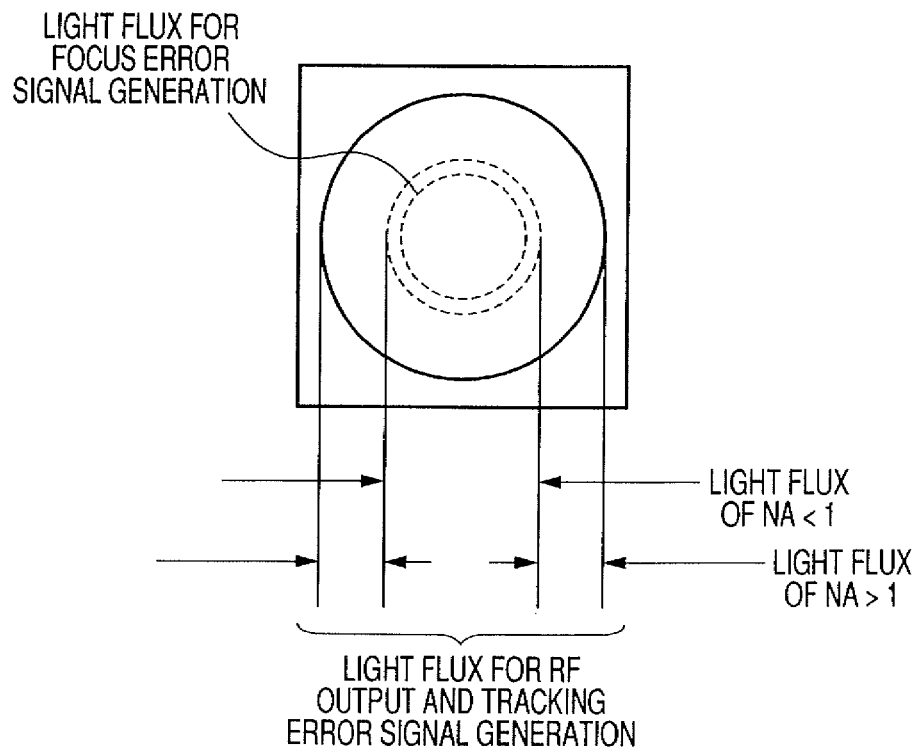
FIG. 13 is a diagram for explaining the pattern of a hologram according to Embodiment 7 of the present invention.

In more detail, in FIG. 13, the reflected light flux from the disc becomes NA=1.4 (NA>1) in the peripheral portion of the pupil diameter. In this embodiment, a part of the light flux of NA<1 in the center of the pupil diameter, for example, NA=about 0.85 is diffracted while the astigmatism is generated for the generation of the focus error signal. A method of diffracting the light flux while the astigmatism is generated by the hologram 41 is well known, and therefore its description will be omitted. The reason why the transmitted light flux is reduced by about 10% with respect to NA=1 is that the light flux that satisfies NA>1 in the outer peripheral portion is prevented from being mixed in the case where the objective lens 10 and the SIL 11 are moved in the disc radial direction with the eccentricity of the disc. The aperture diameter is preferably set to a range of NA=0.75 to 0.95. This is because the focus sensitivity is deteriorated as NA is remarkably reduced. The diffracted light flux for the focus error signal generation is collected on a four-divided light receiving surface (not shown) on an RF/Tr/Fo photodetector (RF/Tr/Fo-PD) 53, to thereby obtain the focus error signal 25 through the known astigmatism method.

In the case where the distance between the SIL and the optical disc is held to a distance that is equal to or less than a fraction of divers of the wavelength 405 nm, for example, 50 nm by the gap servo, the annular portion of NA>1 contains a large quantity of reflected light from the bottom surface of the SIL, which is a noise of the focus error signal 25. Accordingly, the hologram pattern for the focus error signal generation of the hologram 41 diffracts the light flux of NA<1 or lower, for example, NA<0.85 which is an inside of the dotted line of FIG. 13. The light flux of NA<1 contains a large quantity of reflected light from the recording layer of the optical disc 55, thereby enabling focus information to be easily obtained.

The light flux (the total light flux of NA>0.85 and zero-order light of NA<0.85) is collected on the two-divided light receiving surface (not shown) which is disposed in parallel to the above-mentioned four-divided light receiving surface on the RF/Tr/Fo photodetector (RF/Tr/Fo-PD) 53. As a result, the RF output 17 and the tracking error signal 21 are outputted from the photodetector. In this embodiment, the tracking error signal is generated by the well-known push-pull method.

On the other hand, the light flux of NAeff<1 that does not conduct total reflection among the light flux that is reflected by the bottom surface of SIL 11 is reflected as the circularly polarized light that is inversely rotated to the input as with the reflected light from the optical disc 55. In the light flux of NAeff≧1 which occurs total reflection, the light flux produces a phase difference δ which is represented by Expression (2) between the P polarized light component and the S polarized light component, and forms an elliptically polarized light that is deviated from the circularly polarized light. As a result, the reflected light contains the polarized light component in the same direction as with that in the going path after passing through the QWP 8. The polarized light component is reflected by the non-polarization beam splitter (NBS) 4 after passing through the polarization beam splitter (PBS) 7, and collected on the GE photodetector (GEPD) 54. The light quantity of the light flux is monotonously reduced more as the distance between the bottom surface of the SIL and the optical disc is shorter in the near field region, and therefore can be used as the gap error signal 28. When the target threshold value is determined in advance, the 2-axis actuator is driven to conduct the gap servo, thereby enabling the distance between the bottom surface of the SIL and the optical disc to be held to a desired distance of 100 nm or less. Further, the gap error signal 28 can be normalized according to the output of the photodetector (LPC-PD) 6 for controlling the output power of the semiconductor laser 1.

The focus error signal 25 is supplied to a drive source (not shown) of the expander lens 50 through a servo circuit (not shown). As a result, the expander lens 50 is driven to focus the light flux on the recording layer of the optical disc 55.

As described above, with the configuration according to the present invention, the light flux that is input to the NBS 4 and the PBS 7 which are splitting devices becomes a collecting light. For that reason, it is possible to eliminate the lens 15, the lens 19, and the lens 26 for collecting the light on the respective photodetectors, to thereby realize the downsized apparatus and the reduced costs.

According to the present invention, the focus error signal can be used in order to precisely focus the light flux on the recording layer. As a result, even if a slight thickness unevenness occurs in the cover layer, it is possible to follow the thickness unevenness rapidly. As a result, the precise information recording or reproduction can be performed. Further, with the configuration of the present invention, the light flux that is input to the NBS 4 and the PBS 7 which are splitting devices becomes a collected light. For that reason, it is possible to eliminate the lenses for collecting the light on the respective photodetectors as in the conventional example, to thereby realize the downsized apparatus with the shortened optical path length. Further, because at least the lenses for collecting the light flux on a GE photodetector (GEPD) 54 are not required as compared with the conventional example, the cost reduction and downsizing due to a reduction in the number of parts are realized.

Embodiment 8

Figure 14:
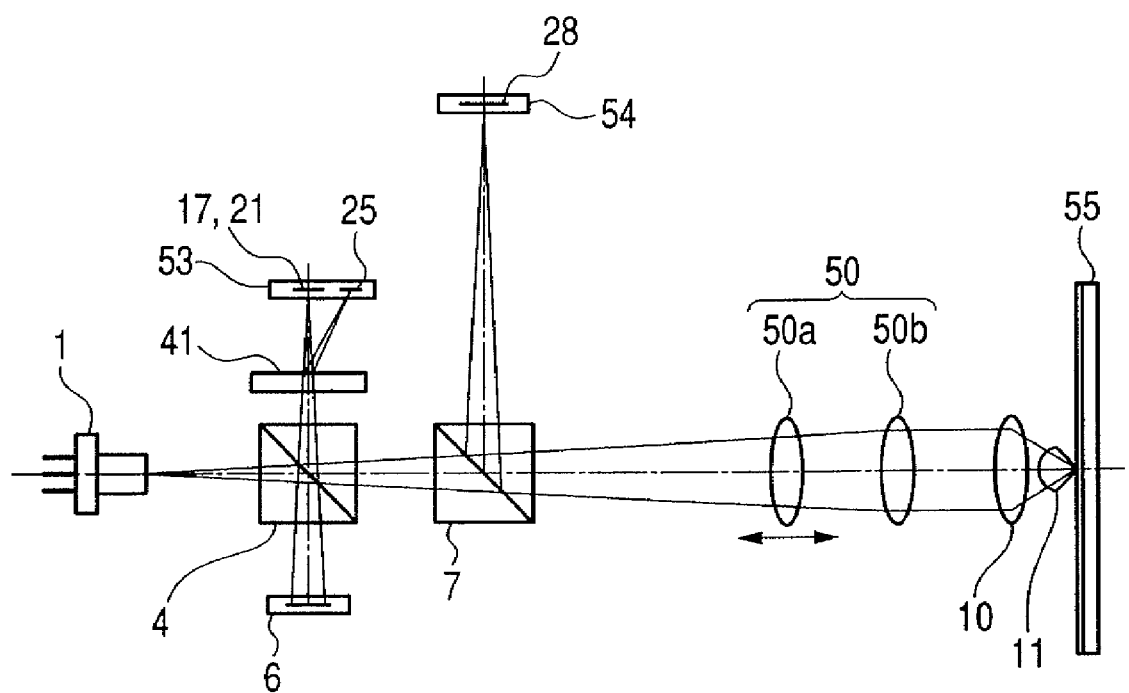
FIG. 14 is a diagram illustrating Embodiment 8 of the present invention.

Embodiment 8 of the present invention will be described with reference to FIG. 14. In this embodiment, the same devices as those in Embodiment 7 of FIG. 12 are denoted by identical symbols.

A light flux that has been output from a semiconductor laser 1 having a wavelength of 405 nm passes through the polarization beam splitter (PBS) 7 through the non-polarization beam splitter (NBS) 4, and is input to the expander lens 50. The light flux that has been reflected by the non-polarization beam splitter (NBS) 4 is directed toward the photodetector (LPC-PD) 6 for controlling the output power of the semiconductor laser 1. The light flux that has been input to the expander lens 50 is converted into a collimated light flux, and input to the rear lens 10 of the objective lens. The expander lens 50 includes a first expander lens 50a and a second expander lens 50b. Further, in this embodiment, the first expander lens 50a is moved along the optical axial direction on the basis of the focus error signal that will be described later to focus the light flux on the recording layer of the optical disc 55. The objective lens unit includes the objective lens 10 and the SIL (front lens) 11. The objective lens 10 (rear lens) and the SIL (front lens) 11 are mounted on a 2-axis actuator (not shown) that drives those two lenses integrally in a focus direction and in a tracking direction The SIL 11 of the hemispherical type described with reference to FIG. 20 is used. The objective lens (rear lens) 10 of NA=0.7 is combined with the SIL 11 of the hemispherical lens of N=2 to provide NAeff=1.4.

Only in the case where the distance between the bottom surface of the SIL and the optical disc 55 is a short distance that is equal to or less than a fraction of divers of the wavelength 405 nm of the light source, for example, 100 nm or less, the light spot affects the recording surface from the bottom of the SIL as an evanescent light. Therefore, recording/reproduction can be conducted by the light spot diameter of NAeff. In order to keep the above distance, the above-mentioned gap servo is employed.

The light flux that has been reflected by the optical disc 55 is input to the SIL 11 and the objective lens 10 and again converted into a collimated light flux. The collimated light flux passes through the expander lens 50 into the converging light, and the light flux of the linearly polarized light in the same direction as that in the going path passes through the PBS 7 and is then reflected by the NBS 4. Means for generating the RF output 17, the tracking error signal 21, and the focus error signal 25 according to the light flux that has been reflected by the NBS 4 is identical with that in Embodiment 1, and therefore its description will be omitted.

The focus error signal 25 is supplied to a drive source (not shown) of an expander lens 50a through a focus servo circuit. As a result, the expander lens 50a is driven to focus the light flux on the recording layer of the optical disc 55. On the other hand, the light flux of NAeff<1 that does not conduct total reflection among the light fluxes that are reflected by the bottom surface of SIL 11 is reflected as the same linearly polarized light as that at the time of inputting the light flux as with the reflected light from the optical disc 55. In the light flux of NAeff≧1 which occurs total reflection, the light flux that is input to the bottom surface of the SIL at an azimuth other than the input polarization direction and a direction orthogonal to the input polarization direction produces a phase difference δ which is represented by Expression (2) between the P polarized light component and the S polarized light component, and forms an elliptically polarized light. As a result, the reflected light contains the polarized light component in the direction orthogonal to that in the going path. The polarized light component is reflected by the polarization beam splitter (PBS) 7, and collected on the GE photodetector (GEPD) 54. The light quantity of the light flux is monotonously reduced more as the distance between the bottom surface of the SIL and the optical disc is shorter in the near field region, and therefore can be used as the gap error signal 28. When the target threshold value is determined in advance, the 2-axis actuator is driven to conduct the gap servo, thereby enabling the distance between the bottom surface of the SIL and the optical disc to be held to a desired distance of 100 nm or less. Further, the gap error signal 28 can be normalized according to the output of the photodetector (LPC-PD) 6 for controlling the output power of the semiconductor laser 1.

In this embodiment, because it is possible to eliminate the QWP in addition to the advantages of Embodiment 7, the further reduction of the costs can be realized.

Figure 15:
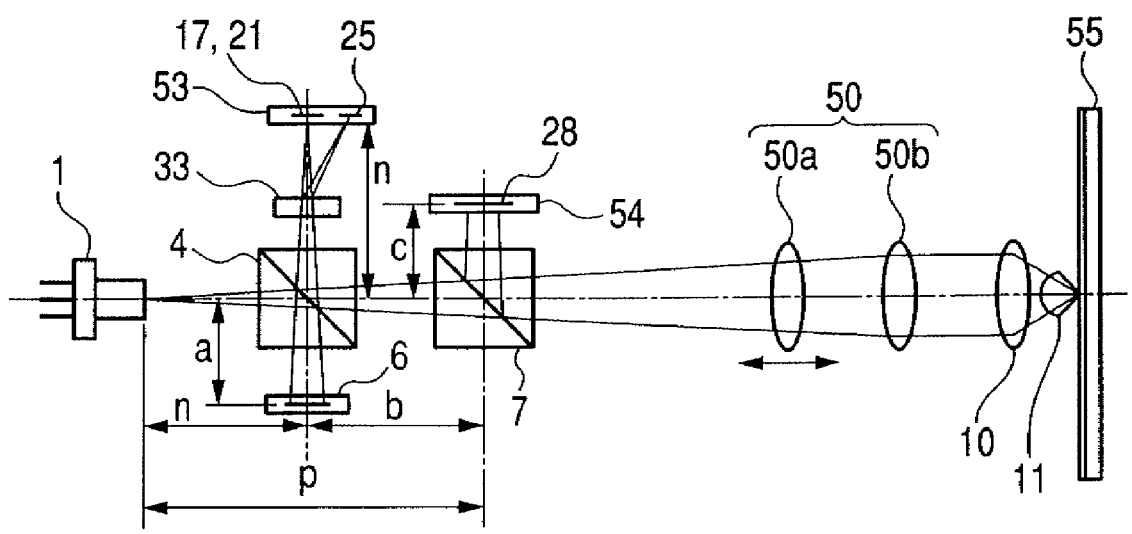
FIG. 15 is a diagram for explaining the arrangement of GEPD according to the Embodiment 8 of the present invention.

Further, as shown in FIG. 15, the GEPD 54 is disposed at a potion of the distance c from the optical axis of the going path, thereby enabling the apparatus to be further downsized. The optical system according to the present invention collects the light flux on the respective photodetectors by the aid of the phenomenon that the light flux of the return path in the NBS 4 and the PBS 7 is converted into a converging light by the expander lens 50. For that reason, as shown in FIGS. 12 and 14, the distances between the respective splitting devices and the respective photodetectors are longer at the splitting device (PBS 7) side which is closer to the expander lens 50. More specifically, a distance that is substantially equivalent to the distance n between the semiconductor laser 1 and the center (cross point between the optical axis and the reflected surface) of the NBS 4, and a distance between the center of the NBS 4 and the RF/Tr/Fo-PD are required. Likewise, when it is assumed that a distance between the semiconductor laser 1 and the center of the PBS 7 is p, the distance between the center of the PBS 7 and the GEPD 54 is also about p.

However, the light flux that is split by the PBS 7 in this embodiment generates a gap error signal 28. Because the gap error signal 28 is detected by the total of the light quantity, it is possible to use the same sensor as the photodetector (LPC-PD) 6 for controlling the output power of the semiconductor laser 1. For that reason, as shown in FIG. 15, in the case where it is assumed that the distance between the optical axis of the going path and the LPC-PD is a, and the distance between the center of the NBS 4 and the center of the PBS 7 is b, when a distance c between the optical axis of the going path and the GEPD 54 satisfies the following expression, the received light flux does not exceed the detection region of the photodetector.

$$C \geq (b-a) \quad (3)$$

Because it is obvious that the distance p between the semiconductor laser 1 and the PBS 7 meets p>b, the minimum value of c meets c<p, and it is possible to reduce the distance between the center of the PBS 7 and the GEPD 54. As a result, the apparatus is further downsized.

Embodiment 9

Figure 16:
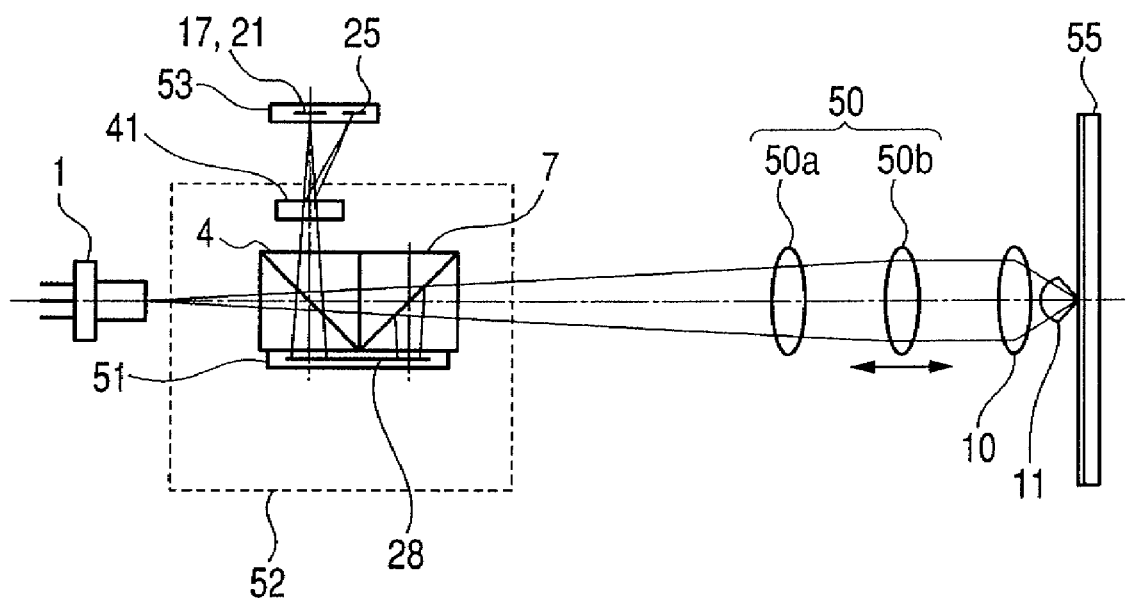
FIG. 16 is a diagram illustrating Embodiment 9 of the present invention.

Embodiment 9 of the present invention will be described with reference to FIG. 16. In this embodiment, the same devices as those in Embodiment 8 are denoted by identical symbols.

The light flux that has been output from the semiconductor laser 1 having a wavelength of 405 nm passes through a light integration unit 52 that will be described later, and is then inputted to the expander lens 50. The light integration unit 52 includes a photodetector for output power control of the semiconductor laser 1, an LPC/GE photodetector (LPC/GE-PD) 51 that is integrated with the photodetector for generation of the above gap error signal, the NBS 4, and the PBS 7, which are integrated together. The light flux that has been reflected by the non-polarization beam splitter (NBS) 4 is directed toward the LPC/GE-PD 51 for controlling the output power of the semiconductor laser 1. The light flux that has been input to the expander lens 50 is converted into a collimated light flux, and then input to the rear lens 10 of the objective lens. The expander lens 50 includes a first expander lens 50a, and a second expander lens 50b. Further, in this embodiment, the second expander lens 50b can be moved along the optical axial direction on the basis of the focus error signal that will be described later to focus the light flux on the recording layer of the optical disc 55. The objective lens unit includes the objective lens (rear lens) 10 and the SIL (front lens) 11, and the objective lens (rear lens) 10 and the SIL (front lens) 11 are mounted on a 2-axis actuator (not shown) that drives those two lenses integrally in a focus direction and in a tracking direction. The SIL is of the hemispherical type SIL described with reference to FIG. 20. The objective lens (rear lens) 10 of NA=0.7 is combined with the SIL 11 of the hemispherical lens of N=2 to provide NAeff=1.4.

Only in the case where the distance between the bottom surface of the SIL and the optical disc 55 is a short distance that is equal to or less than a fraction of divers of the wavelength 405 nm of the light source, for example, 100 nm or less, the light spot affects the recording surface from the bottom of the SIL as an evanescent light. Therefore, recording/reproduction can be conducted by the light spot diameter of NAeff. In order to keep the above distance, the above-mentioned gap servo is employed.

The light flux that has been reflected by the optical disc 55 is input to the SIL 11 and the objective lens 10 and again converted into a collimated light flux. The collimated light flux passes through the expander lens 50 into the converging light, and the light flux of the linearly polarized light in the same direction as that in the going path passes through the PBS 7 and is then reflected by the NBS 4. Means for generating the RF output 17, the tracking error signal 21, and the focus error signal 25 according to the light flux that has been reflected by the NBS 4 is identical with that in Embodiment 7, and therefore its description will be omitted.

The focus error signal 25 is supplied to a drive source (not shown) of an expander lens 50b through a servo circuit (not shown). As a result, the expander lens 50b is driven to focus the light flux on the recording layer of the optical disc 55.

On the other hand, the light flux of NAeff<1 that does not conduct total reflection among the light flux that is reflected by the bottom surface of SIL 11 is reflected as the same linearly polarized light as that at the time of inputting the light flux as with the reflected light from the optical disc 55. In the light flux of NAeff≧1 which occurs total reflection, the light flux that is input to the bottom surface of the SIL at an azimuth other than the input polarization direction and a direction orthogonal to the input polarization direction produces a phase difference δ which is represented by Expression (2) between the P polarized light component and the S polarized light component, and forms an elliptically polarized light. As a result, the reflected light contains the polarized light component in the direction orthogonal to that in the going path. In the light integration unit 52, the polarized light component is reflected by the polarization beam splitter (PBS) 7, and collected on the LPC/GE-PD 51. The light quantity of the light flux is monotonously reduced more as the distance between the bottom surface of the SIL and the optical disc is shorter in the near field region, and therefore can be used as the gap error signal 28. When the target threshold value is determined in advance, the 2-axis actuator is driven to conduct the gap servo, thereby enabling the distance between the bottom surface of the SIL and the optical disc to be held to a desired distance of 100 nm or less. Further, the gap error signal 28 can be normalized according to the output of the photodetector for controlling the output power of the semiconductor laser 1.

In this embodiment, because the NBS 4, the PBS 7, and the LPC/GE-PD 51 are integrated together, the further reduction of the costs can be realized in addition to the advantages of Embodiment 8. Further, because it is unnecessary to adjust the positions of the respective parts, the reduction in the costs due to the reduced number of assembling can be realized. Further, as described above, in the case where the gap error signal 28 is normalized on the basis of the output of the photodetector for controlling the output power of the semiconductor laser 1, because calculation can be performed within the same sensor, an improvement in the signal quality can be realized.

The present invention is not limited to only the above embodiment, but is capable of using, for example, an optical disc of surface recording.

Embodiment 10

An embodiment of the present invention will be described with reference to FIGS. 1 to 3. FIG. 1 is a diagram for explaining the configuration of an optical information recording/reproducing apparatus for near field recording according to the present invention.

A light flux that has been output from the semiconductor laser 1 having a wavelength of 405 nm is converted into a collimated light flux by the collimator lens 2, and input to the beam shaping prism 3 to provide an isotropic light quantity distribution. The light flux that has been transmitted by the polarization beam splitter (PBS) 7 through the non-polarization beam splitter (NBS) 4 passes through the ¼ waveform plate (QWP) 8, and is converted into the circularly polarized light from the linearly polarized light. There is provided a photodetector (LPC-PD) 6 for receiving a light flux that has been reflected by the non-polarization beam splitter (NBS) 4 to control the output power of the semiconductor laser 1. The light flux that has been transmitted by the ¼ wavelength plate is input to the expander lens 9. The expander lens 9 is a lens for correcting the spherical aberration that occurs in the objective lens and the SIL which will be described later, and is so adapted as to control the interval between those two lenses according to the spherical aberration. The light flux from the expander lens is input to the rear lens 10 of the objective lens. The objective lens unit includes the objective lens (rear lens) 10 and the SIL (front lens) 11, and the objective lens (rear lens) 10 and the SIL (front lens) 11 are mounted on a 2-axis actuator (not shown) that drives those two lenses integrally in a focus direction and in a tracking direction. The SIL is of the hemispherical type SIL described with reference to FIG. 20. The objective lens (rear lens) 10 of NA=0.7 is combined with the SIL 11 of the hemispherical lens of the refractive index N=2 to provide NAeff=1.4.

Only in the case where the distance between the bottom surface of the SIL and the optical disc 12 is a short distance that is equal to or less than a fraction of divers of the wavelength 405 nm of the light source, for example, 100 nm or less, the light spot affects the recording surface from the bottom of the SIL as an evanescent light. Therefore, recording/reproduction can be conducted by the light spot diameter of NAeff. In order to keep the distance, the above-mentioned gap servo is employed. The optical disc 12 is a dual-layer disc having two recording layers shown in FIGS. 22 and 23. A distance between the layers is 3 μm, the interlayer material is made of NH-7210 made by Mitsubishi Rayon Co., Ltd., which is 1.48 in refractive index.

The light flux that has been reflected by the optical disc 12 is converted into a circularly polarized light that is inversely rotated, input to the SIL 11 and the objective lens 10, and is again converted into a collimated light flux. The light flux that has passed through the expander lens 9 and the ¼ wavelength plate 8, and is converted into a linearly polarized light in a direction orthogonal to the going path is reflected by the PBS 7. The S polarized light component in the light flux whose polarization surface has been rotated 45° by the ½ wavelength plate (HWP) 13 is reflected by the polarization beam splitter 14, and collected on the photodetector 1 (PD 1) 16 via the lens 15 to reproduce the RF output 17 that is information on the optical disc 12. The P polarized light component in the light flux whose polarization surface has been rotated 45° by the ½ wavelength plate (HWP) 13 is transmitted through the polarization beam splitter 14, reflected by the non-polarization beam splitter 18, and is then collected on the two-division photodetector 2 (PD 2) 20 through the lens 19 to output the tracking error 21. The light flux that has been transmitted through the non-polarization beam splitter 18 passes through the aperture 22, and the outer peripheral portion of the light flux is shielded from light. Then, the light flux is collected on the photodetector 4 (PD 4) 25 via a sensor lens (cylindrical lens) 23 that generates the astigmatism to output the focus error signal 25.

A portion surrounded by the dotted line will be described in more detail with reference to FIGS. 2 and 3. Referring to FIG. 2, the reflected light flux from the disc becomes NA=1.4 (NA>1) in the peripheral portion of the pupil diameter of the objective lens. The aperture 22 transmits the light flux of NA<1 in the center of the pupil diameter, for example, NA=about 0.88, and shields the light flux of NA>1 in the outer periphery from the light. The reason why the transmitted light flux is reduced to about 10% with respect to NA=1 is that the light flux that satisfies NA>1 in the outer peripheral portion is prevented from being mixed in the case where the objective lens 10 and the SIL 11 are moved in the disc radial direction with the eccentricity of the disc.

FIG. 3 schematically shows the light quantity distribution within the pupil of the objective lens. FIG. 3 shows a case where the distance between the SIL and the optical disc is held to a distance that is equal to or less than a fraction of divers of the wavelength 405 nm, for example, 50 nm by the gap servo. The annular portion of NA>1 contains a large quantity of reflected light from the bottom surface of the SIL, which causes a noise of the focus error signal. Accordingly, the aperture 22 allows only the light flux of NA<1 or lower, in this embodiment, NA<0.88 which is an inside of the dotted line of FIG. 3 to be transmitted. The light flux of NA<1 or lower contains a large quantity of reflected light from the recording layer of the optical disc 12, thereby obtaining the accurate focus error signal.

The focus error signal 25 is supplied to the voice coil motor 201 for adjusting the interval between the objective lens 10 and the SIL 11 through a servo circuit (not shown). In a case where the light flux is focused on the L0 recording layer, as shown in FIG. 22, the interval between the objective lens 10 and the SIL 11 is adjusted to d1 by the voice coil motor 201. Further, in a case where the light flux is focused on the L1 recording layer, as shown in FIG. 23, the interval between the objective lens 10 and the SIL 11 is adjusted to d2 by the voice coil motor 201. In any case, the reflected light flux from the recording layer passes through the objective lens 10 and the SIL 11, and is collimated by the expander lens 9, and the position of the sensor lens 23 is adjusted in advance such that the focus error signal at that time becomes zero.

Next, the details of the focus error detection optical system will be described.

A focal distance of the combination due to the objective lens 10 and the SIL 11 is fobj=0.96 mm, the effective light flux diameter is 2.7 mm, and the diameter of the aperture 22 is 1.7 mm. On the other hand, a mean focal distance at the detection side is fcon=43.5 mm. Hence, a means imaging magnification β from the recording layer of the optical disc to the quadrant photodetector (PD4) 25 is 46 times. In this case, the mean focal distance and the mean imaging magnification indicate the mean values of the focal distances in the respective focal line directions of the astigmatism, and the magnifications, respectively. The sensor lens 23 has a first surface of a cylindrical surface and a second surface of a sphere.

Figure 17:
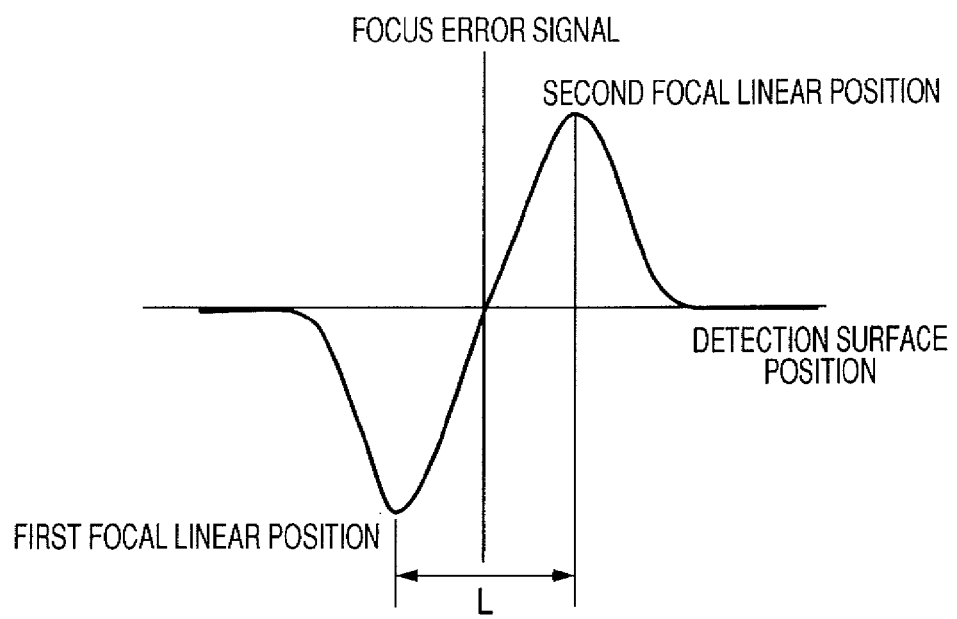
FIG. 17 is a diagram illustrating a configuration of an S curve that is obtained by a focus error detecting optical system according to Embodiment 10 of the present invention.

The configuration of an S curve that is outputted by the quadrant photodetector (PD4) 25 is shown in FIG. 17. The positional interval between the maximum value and the minimum value of the S curve corresponds to the positions of the respective focal lines due to the astigmatism, and an interval L is 2.6 mm.

Figure 18:
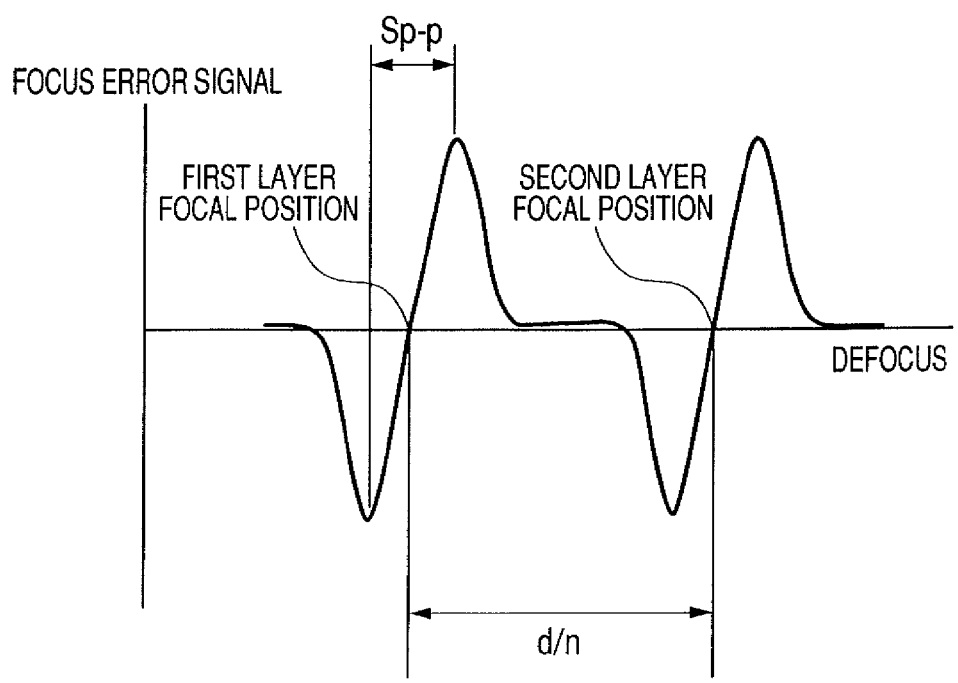
FIG. 18 is a diagram illustrating a configuration of the S curve in the vicinity of focusing on a first layer and a second layer.

The appearances of the S curve due to the reflected light flux from the first layer and the S curve due to the reflected light flux from the second layer are shown in FIG. 18. The capture range Sp-p of the S curve with respect the shift length from the focal position can be approximated by the following expression with the aid of the mean imaging magnification β.

$$Sp\text{-}p = L/(\beta^2 \times 2)$$

From the above expression, the capture range Sp-p of the S curve is about 0.6 μm.

The optical distance between the focal position of the first layer and the focal position of the second layer can be represented by d/n which is 2 μm. Further, the focal shift length between the focal position of the first layer and a bottom where the S curve is again returned to a zero level is about a distance of Sp-p, and the same is applied to the focal shift length between the focal position of the second layer and a bottom of the S curve. Therefore, when an optical distance d/n between the layers is larger than twice of Sp-p, that is, when $d/n > 2 \times L/(\beta^2 \times 2) = d/n > L/\beta^2$ is satisfied, the S curves due to the reflected lights from the respective layers can be excellently separated from each other without any interference with each other. In this embodiment, Sp-p=0.6 µm is met with respect to d/n=2.0 µm, and it is found that the conditions of the S curve separation are sufficiently met.

In order to satisfy the above conditions, it is possible to adjust the refractive index of a material that constitutes a portion between the recording layers in the recording medium, or the film thickness. Alternatively, the conditions can be satisfied by adjusting the powers of the respective lenses that exist in the reflective optical system between the recording layer of the optical disc and the quadrant photodetector (PD 4) 25. Further, the conditions can be satisfied by adjusting the radius of curvature of a sensor lens (cylindrical lens) that generates the astigmatism to adjust the astigmatism quantity.

In the present invention, even in a case where the multi-layer recording medium is recorded or reproduced with the aid of the SIL, the detection of the focus error signal is not affected by the adjacent layer, and the offset and the linearity are not disturbed. As a result, it is possible to readily conduct drawing in an arbitrary layer, the focus jump.

Furthermore, in addition to the above-mentioned conditions of the S curve separation, in order to prevent the crosstalk between the layers and obtain an excellent reproduction signal, it is desirable to satisfy the following conditions.

$$d > 2500 \cdot T^2 / (\tan(\sin^{-1}(NAeff/n))^2 \cdot \pi)$$

d: distance between recording layers
T: mean run length (mean value of recording mark length)
n: refractive index between recording layers This can be realized by adjusting the refractive index of the material that constitutes the portion between the recording layers in the recording medium, and the film thickness. Alternatively, the conditions can be met by adjusting the powers of the lenses in the converging optical system.

In order to separate the S curves with respect to the multi-layer optical disc having the thin layer interval according to the present invention, it is necessary to increase the mean imaging magnification from the recording layer to the photodetector than the conventional one. Therefore, in order to set the spot size on the surface of the photodetector to an appropriate value (about 50 to 100 µm), and make the size of the focus error detection optical system compact, it is particularly preferable that the aperture diameter is as large as possible and set in a range of NA=0.75 to 0.95.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2006-070839, filed Mar. 15, 2006, Japanese Patent Application No. 2006-070841, filed Mar. 15, 2006, Japanese Patent Application No. 2006-071124, filed Mar. 15, 2006, Japanese Patent Application No. 2006-071129, filed Mar. 15, 2006, and Japanese Patent Application No. 2006-118789, filed Apr. 24, 2006, which are hereby incorporated by reference herein in their entirety.

What is claimed is:

1. An optical information recording/reproducing apparatus that records or reproduces information using a light spot due to a near field effect, the apparatus comprising:
  a laser beam source;
  an objective lens that collects a light flux from the laser beam source;
  an SIL that is disposed between the objective lens and an optical recording medium;
  a light receiving device that receives a reflected light flux from the optical recording medium;
  a splitting device that guides the light flux of an effective numerical aperture NAeff<1 due to the objective lens and the SIL within a pupil among the reflected light fluxes to the light receiving device;
  a control circuit that focuses the light flux on a recording layer of the optical recording medium based on a focus error signal obtained by the light receiving device;
  an expander lens, a ¼ wavelength plate, and a polarization beam splitter, which are disposed between the objective lens and the light receiving device;
  a first photodetector that receives the light flux split by the polarization beam splitter; and
  a second photodetector that receives the light flux split by a non-polarization beam splitter,
  wherein one of the objective lens and the expander lens disposed between the objective lens and the laser beam source is driven under control of the control circuit;
  wherein the expander lens has a collimator function;
  wherein the expander lens having the collimator function includes one lens or two lenses and is movable in a focus direction;
  wherein the polarization beam splitter and the non-polarization beam splitter are disposed between the laser beam source and the expander lens having the collimator function,
  wherein the polarization beam splitter splits a reflected light flux from a bottom of the SIL, and a gap error signal used for controlling a gap interval between the SIL and the optical recording medium is generated according to the reflected light flux,
  wherein the non-polarization beam splitter splits the reflected light flux from the optical recording medium, and a focus error signal is generated according to the reflected light flux from the optical recording medium, and
  wherein a distance of the first photodetector from a center of the polarization beam splitter is shorter than a distance between the second photodetector and a center of the non-polarization beam splitter.

2. The optical information recording/reproducing apparatus according to claim 1, wherein the non-polarization beam splitter is disposed between the objective lens and the light receiving device.

3. The optical information recording/reproducing apparatus according to claim 1,
  wherein the optical recording medium includes plural recording layers, and one of the objective lens and the expander lens conducts an interlayer jump between the plural recording layers based on the focus error signal.

4. An optical information recording/reproducing apparatus that records or reproduces information using a light spot due to a near field effect, the apparatus comprising:
  a laser beam source;

an objective lens that collects a light flux from the laser beam source;

an SIL that is disposed between the objective lens and an optical recording medium;

a light receiving device that receives a reflected light flux from the optical recording medium;

a splitting device that guides the light flux of an effective numerical aperture NAeff<1 due to the objective lens and the SIL within a pupil among the reflected light fluxes to the light receiving device;

a control circuit that focuses the light flux on a recording layer of the optical recording medium based on a focus error signal obtained by the light receiving device; and an expander lens, a ¼ wavelength plate, and a polarization beam splitter, which are disposed between the objective lens and the light receiving device, wherein the optical recording medium includes plural recording layers, and satisfies an expression:

$$d/n > L1/\beta^2,$$

where d is an interval between the recording layers, n is a refractive index between the recording layers, L1 is a positional interval between a maximum value and a minimum value of an S curve of the focus error signal, and β is a mean imaging magnification from a recording layer to the light receiving device.

5. The optical information recording/reproducing apparatus according to claim 4, wherein the effective numerical aperture (NAeff) of the objective lens satisfies an expression:

$$d > 2500 \cdot T^2 / (\tan(\sin^{-1}(NAeff/n))^2 \cdot \pi),$$

where d is the interval between the recording layers, T is a mean run length, and n is the refractive index between the recording layers.

6. An optical information recording/reproducing apparatus that records or reproduces information using a light spot due to a near field effect, the apparatus comprising:

a laser beam source;

an objective lens that collects a light flux from the laser beam source;

an SIL that is disposed between the objective lens and an optical recording medium;

a light receiving device that receives a reflected light flux from the optical recording medium;

a splitting device that guides the light flux of an effective numerical aperture NAeff<1 due to the objective lens and the SIL within a pupil among the reflected light fluxes to the light receiving device;

a control circuit that focuses the light flux on a recording layer of the optical recording medium based on a focus error signal obtained by the light receiving device; and an expander lens, a ¼ wavelength plate, and a polarization beam splitter, which are disposed between the objective lens and the light receiving device, wherein the optical recording medium includes an optical device that has plural recording layers and generates astigmatism, and satisfies an expression:

$$d/n > L2/\beta^2,$$

where d is an interval between the recording layers, n is a refractive index between the recording layers, L2 is a distance between a first focal line and a second focal line due to the astigmatism generated by the optical device, and β is a mean imaging magnification from a recording layer to the light receiving device.

* * * * *